(12) United States Patent
Wang

(10) Patent No.: US 12,313,961 B1
(45) Date of Patent: May 27, 2025

(54) OMNIBEARING SURVEILLANCE CAMERA

(71) Applicant: Gang Wang, Shenzhen (CN)

(72) Inventor: Gang Wang, Shenzhen (CN)

( * ) Notice: Subject to any disclaimer, the term of this patent is extended or adjusted under 35 U.S.C. 154(b) by 0 days.

(21) Appl. No.: 18/629,698

(22) Filed: Apr. 8, 2024

(51) Int. Cl.
| | |
|---|---|
| *G03B 17/56* | (2021.01) |
| *G03B 15/05* | (2021.01) |
| *H04N 23/695* | (2023.01) |
| *H04N 23/698* | (2023.01) |

(52) U.S. Cl.
CPC ............ *G03B 17/561* (2013.01); *G03B 15/05* (2013.01); *H04N 23/695* (2023.01); *H04N 23/698* (2023.01)

(58) Field of Classification Search
CPC ...... G03B 15/02; G03B 15/03; G03B 15/035; G03B 15/04; G03B 15/0405; G03B 15/0442; G03B 17/561; H04N 23/23; H04N 23/695; H04N 23/698
See application file for complete search history.

(56) References Cited

U.S. PATENT DOCUMENTS

| | | | | |
|---|---|---|---|---|
| 2007/0041726 | A1* | 2/2007 | Lee .................... | G03B 17/02 396/427 |
| 2020/0051412 | A1* | 2/2020 | Swiss ............... | G08B 13/19632 |

FOREIGN PATENT DOCUMENTS

| | | |
|---|---|---|
| CN | 207234932 U | 4/2018 |
| CN | 213018599 U | 4/2021 |
| CN | 216819932 U | 6/2022 |
| CN | 219780262 U * | 9/2023 |

* cited by examiner

*Primary Examiner* — Clayton E. LaBalle
*Assistant Examiner* — Fang-Chi Chang
(74) *Attorney, Agent, or Firm* — JEEN IP LAW, LLC

(57) ABSTRACT

The present invention relates to A pan-tilt-zoom camera for omni-directional 360-degree-detection, comprising a top cover, wherein the bottom of the top cover is connected to a bottom cover, the top cover is provided with a circuit board inside, an upper end of the top cover is connected to a screw lamp cap, the screw lamp cap is connected to mains electricity to supply power for the circuit board, the bottom cover comprises an inner bracket and an outer bracket, a camera assembly is provided inside the inner bracket and the outer bracket, and the circuit board is electrically connected to the camera assembly; wherein a slide connection apparatus is provided on the inner bracket, the circuit board is electrically connected to the camera assembly through the slide connection apparatus to power on the camera assembly, and the camera assembly controls the slide connection apparatus to perform 360-degree rotation.

19 Claims, 29 Drawing Sheets

OMNIBEARING SURVEILLANCE CAMERA

TECHNICAL FIELD

The present disclosure relates to the field of surveillance cameras, In particular, it relates to an omnibearing surveillance camera.

BACKGROUND

The surveillance camera is a semiconductor imaging device with the advantages of high sensitivity, strong light resistance, small distortion, small size, long life, vibration resistance, etc. With the development of society and the progress of science, more and more cameras are used, and the requirements for production efficiency are also increasing. During assembly, an existing camera often needs to be fixed by screws, resulting in inconvenient assembly and low assembly efficiency. During disassembly, tools such as a screwdriver are also needed, bringing inconvenience to use. Moreover, the camera also needs to rotate at different angles for surveillance, and the existing clamping type camera cannot implement rotational surveillance at any angle or has a limited angle of rotational surveillance, such that there are many dead corners of surveillance. In addition, multiple cameras can only be used for surveillance and cannot implement extension of other functions, thereby having low practicability; and a single camera has defects in surveillance and cannot meet the requirements of remote high-definition surveillance.

SUMMARY

The technical problem to be solved by the invention lies in: the existing clamping type camera cannot implement rotational surveillance at any angle or has a limited angle of rotational surveillance, such that there are many dead corners of surveillance. In addition, multiple cameras can only be used for surveillance and cannot implement extension of other functions, thereby having low practicability; and a single camera has defects in surveillance and cannot meet the requirements of remote high-definition surveillance. Aiming at the above defects of the prior art, An omnibearing surveillance camera is provided.

In order to solve the above technical problems, the technical scheme adopted by the invention is:

Construct An omnibearing surveillance camera, comprising a lamp cap, a threaded interface being connected to the lamp cap, a power board connected to the threaded interface and a first motor arranged in the lamp cap being arranged in the lamp cap, a mains supply being connected by the threaded interface to supply power to the power board, the mains supply being outputted after undergoing voltage reduction and rectification by the power board, a rotatable ball head being connected to a lower part of the lamp cap, wherein a surveillance camera, a camera mainboard, and a second motor connected to the camera mainboard are arranged in the ball head; and the camera mainboard is powered by the power board, and drives the first motor to drive the ball head to rotate left and right and/or drives the second motor to rotate to drive the ball head to rotate up and down, so as to implement rotational surveillance of the surveillance camera at any angle.

Optimization of, wherein the lamp cap is connected and fixed to the ball head by a bracket and is connected and locked to the bracket by a first clamping structure; the bracket comprises a rotary bracket and a bracket housing connected to the rotary bracket by a second clamping structure; the ball head is fixed to the rotary bracket by the bracket housing and is rotatable relative to the bracket housing; and the rotary bracket is clamped and fixed to the lamp cap and is rotatable relative to the lamp cap.

Optimization of, wherein the first clamping structure comprises a sliding groove provided on an inner wall of an upper end of the lamp cap and a convex ring arranged at a bottom of the rotary bracket in a manner of corresponding to the sliding groove; the convex ring is clamped into the sliding groove and is rotatable in the sliding groove; and at least one clamping block is further arranged at an upper end of the sliding groove and restricts the convex ring clamped into the sliding groove from separating from the sliding groove when the convex ring rotates in the sliding groove.

Optimization of, wherein the second clamping structure comprises protrusions arranged on the rotary bracket; recesses are provided on the bracket housing in a manner of corresponding to the protrusions; bayonets are provided on the protrusions; bumps corresponding to the bayonets are arranged on the recesses and are clamped into the bayonets to lock the rotary bracket to the bracket housing; and the protrusions are relatively movable to release a locking effect of the clamping structure.

Optimization of, wherein two lugs are further arranged on the rotary bracket; one of the lugs is rotatably connected to one end of the ball head, and the other of the lugs is provided with a vertical groove; the other end of the ball head is placed in the vertical groove, and the ball head is caused to rotate relative to the rotary bracket; and a rib is arranged on the bracket housing in a manner of corresponding to the vertical groove and is inserted into the vertical groove.

Optimization of, wherein a rotating shaft of the second motor extends out of the ball head and is placed in the vertical groove; the vertical groove generates a clamping force on the rotating shaft, such that the rotating shaft, when rotating, drives the ball head to rotate relative to the rotary bracket; a support plate for supporting the rotating shaft of the second motor is further provided in the rotary bracket and is placed between the two lugs; and when the rotary bracket is locked to the bracket housing, a lower end of the rib is in contact with an upper end of the rotating shaft of the second motor.

Optimization of, wherein a rotating shaft fixing hole of the first motor is provided on the rotary bracket; the first motor is partially inserted into the rotating shaft fixing hole of the first motor and drives the rotary bracket to rotate relative to a lamp base; a ball head fixing hole and a second motor fixing hole are provided on the rotary bracket; one side of the ball head is fixedly arranged in the ball head fixing hole, and the other side of the ball head is arranged in the second motor fixing hole; and the second motor is inserted into the second motor fixing hole to rotate the ball head up and down.

Optimization of, wherein a limiting structure is arranged on the rotary bracket and the bracket housing, and a lower end of the rotary bracket is opened, such that an up-down rotation angle of the ball head is greater than 180°; and a buckle structure is arranged on the rotary bracket and the bracket housing, and the lower end of the rotary bracket wraps the ball head, such that the rotation angle of the ball head is less than 180°.

Optimization of, wherein a sliding connection device connected to the power board is further arranged in the lamp cap and comprises the first motor for driving the sliding connection device to rotate; a rotating shaft of the first motor is sleeved with a sliding connection device bracket; at least two sliding connection assemblies are arranged on the sliding connection device bracket, and each of the sliding connection assemblies comprises a first connecting wire connected to an external signal source and configured to input the external signal source, and a second connecting wire for outputting an input signal; the first connecting wire is connected to the second connecting wire by an adapter ring for signal transmission; and when the rotating shaft of the first motor rotates, the sliding connection assembly is relatively stationary, transmits a signal of the external signal source to the adapter ring by the first connecting wire, and then transmits the signal to the second connecting wire for output.

Optimization of, wherein the sliding connection device transmits an electrical signal; the adapter ring is a conductive ring; the external electrical signal is inputted by the first connecting wire, transmitted to the second connecting wire by the conductive ring, and then outputted; and the sliding connection device bracket is made of a non-conductive material.

Optimization of, wherein an insulating ring is arranged between every two of a plurality of conductive rings; the first connecting wire is in contact with an inner wall of each of the conductive rings for electrical conduction; and the second connecting wire is provided with clamping ends which are in contact with an outer wall of the conductive ring for electrical conduction, and an output end connected to a control board.

Optimization of, wherein the second connecting wire is provided with two clamping ends which are in contact with the outer wall of the conductive ring and share one output end; a sliding groove for fixing the clamping ends is provided on the outer wall of the conductive ring; the two clamping ends are in point contact and/or line contact with the sliding groove for electrical conduction; and a clamping force is generated between the two clamping ends to the conductive ring.

Optimization of, wherein an upper end of the sliding connection device bracket is cylindrical and fixes the sliding connection device, a lower part of the sliding connection device bracket is provided with a support end having a greater radius than the sliding connection device, the upper end of the sliding connection device bracket is provided with square slots for insertion of the first connecting wires and columnar cavities for accommodating the first connecting wires, the square slots communicate with the columnar cavities, one end of each of the first connecting wires extends out of a corresponding one of the columnar cavities to be connected to the external signal source, and the other end of the first connecting wire passes through a corresponding one of the square slots to be in contact with an inner wall of the adapter ring for signal transmission; and a second one of the sliding connection assemblies is a counting device, an insulating part is arranged on the adapter ring, the first connecting wire is in contact with the adapter ring and is provided with a contact point, and when the first connecting wire rotates to the insulating part, electrical signal transmission for the counting device is disabled.

Optimization of, wherein the rotating shaft of the first motor is elliptical, and when the rotating shaft of the first motor rotates, the sliding connection device bracket rotates with the rotating shaft of the first motor and drives the first connecting wires and the adapter rings to rotate with the rotating shaft of the first motor, and the adapter rings are slidably connected to the second connecting wires for signal transmission;

the insulating part is arranged on a surface of a corresponding one of the adapter rings, when the adapter ring rotates, a corresponding one of the first connecting wires keeps in contact with the adapter ring to turn on the counting device, and when the adapter ring rotates to the insulating part and is in contact with the first connecting wire, the counting device is turned off;

or an insulating protrusion is arranged on the adapter ring, an end part of the first connecting wire is in an outward protruding arc shape, when the adapter ring rotates, the first connecting wire keeps in contact with the adapter ring to turn on the counting device, when the adapter ring rotates to the insulating protrusion, the insulating protrusion pushes the first connecting wire to move to be in contact with the insulating protrusion, and the electrical signal transmission for the counting device is disabled, and after the adapter ring continues to rotate, the first connecting wire moves to be in contact with the adapter ring to enable the electrical signal transmission for the counting device; and the control board determines a rotation angle of the counting device based on a duration for which the electrical signal transmission for the counting device is disabled.

Optimization of, further comprising at least one lamp panel which emits light so that the camera turns into a lighting device to provide lighting.

Optimization of, wherein the lamp panel is arranged outside the lamp cap by a rotating mechanism; the rotating mechanism comprises a connecting column arranged below the lamp panel and two connecting lugs arranged on the lamp cap; a rotating shaft is arranged at two ends of the connecting column; rotating holes are correspondingly provided on the connecting lugs; and the rotating shaft is inserted into the rotating holes to fix the connecting column between the two connecting lugs, such that the lamp panel rotates relative to the lamp cap.

Optimization of, wherein travel grooves are provided on two sides of the connecting column; travel teeth are arranged on the connecting lugs in a manner of corresponding to the travel grooves; the travel teeth rotate in the travel grooves to limit a rotation angle of the lighting device on the lamp base; when the travel teeth are located at end parts of the travel grooves, an angle between the lighting device and the lamp base is 0° or 90°; angular grooves are provided in each of the travel grooves; and when the travel teeth are placed in the angular grooves, an angle of the lighting device is fixed.

Optimization of, wherein there are a plurality of lamp panels evenly distributed around the lamp cap;

or the lamp panels are placed in the ball head made of a light-transmitting material, and after the lamp panels emit light, the ball head emits light, such that the camera provides lighting.

Optimization of, wherein an infrared thermal imager, a lighting lamp, or a panoramic camera is further arranged on the ball head;

or at least one infrared thermal imager, radar or panoramic camera is arranged at a bottom of the bracket housing, and at least two infrared thermal imagers or radars are arranged to implement 360° surveillance.

Optimization of, wherein the threaded interface is capable of being replaced with a socket to be connected to the mains supply for supplying power to the power board.

The present disclosure has the following beneficial effects: the threaded interface arranged above the lamp cap is connected to the mains supply, the mains supply undergoes voltage reduction by the power board arranged in the lamp cap and then supplies power to the mainboard, and the mainboard drives the first motor and the second motor to rotate so as to implement surveillance of the camera at any angle. Moreover, the clamping and locking structure between the rotary bracket and the bracket housing facilitates assembly and disassembly of the camera. The vertical groove is provided on the lug to place the rotating shaft of the second motor therein. Since the rotating shaft of the second motor is not circular, when the second motor operates, the rotating shaft is stationary due to the clamping effect between the rotating shaft of the second motor and the vertical groove, and the second motor rotates to drive the ball head to rotate up and down. The clamping effect of the rib also avoids up-down shaking of the rotating shaft of the second motor and is more stable. Besides, the bumps are pressed out of the bayonets, such that the camera can be disassembled more conveniently.

The signal is inputted from the external signal source by the first connecting wire and outputted by the second connecting wire through relative rotation of the sliding connection device. The rotating shaft of the motor rotates to drive the ball head to rotate at any angle while avoiding deflection of the first connecting wire. Moreover, the two clamping points are provided for the second connecting wire and the conductive ring, which enhances the stability of connection between the second connecting wire and the conductive ring. The clamping force between the two clamping points and the way of line contact also further enhance the stability of connection. The conductive device is arranged on the rotating shaft and rotates relative to the rotating shaft, such that the overall size of the sliding connection device is reduced, and the use of the sliding connection device is facilitated. Besides, the counting device is arranged on the functional wire, and the rotation angle of the counting device is determined based on the duration for which the electric signal transmission between the first connecting wire and the conductive ring is disabled, which facilitates resetting.

The lighting device is arranged outside the lamp base, which adds the function of the camera. The lighting device is fixed by using the rotating mechanism, which facilitates unfolding and folding of the lighting device. Moreover, the travel grooves are provided on the rotating mechanism to limit the rotation angle thereof, and the angular grooves are provided to fix the travel grooves at a set angle, making it more convenient to use. The ball head may be set to be made of the light-transmitting material and the lamp panel is arranged in the ball head so that the ball head emits light like a light bulb to provide lighting. The bracket housing and the rotary bracket are fixed in different forms, such that the up-down rotation angles and the appearances of the product are different and can be selected according to different requirements. Moreover, the limiting structure or the buckle structure facilitates assembly of the rotary bracket and the bracket housing. The high-definition camera on the ball head is combined with the infrared thermal imager, the panoramic camera, or the lighting lamp, which improves the surveillance effect of the high-definition camera.

BRIEF DESCRIPTION OF DRAWINGS

In order to more clearly illustrate the embodiments of the present invention or the technical solutions in the prior art, the present invention will be further described below with reference to the accompanying drawings and embodiments. For ordinary technical personnel, other drawings can also be obtained from these drawings without any creative effort.

DETAILED DESCRIPTION OF THE EMBODIMENTS

In order to make the purposes, technical solutions and advantages of the embodiments of the present invention clearer, the following will be described clearly and completely in combination with the technical solutions in the embodiments of the present invention. Obviously, the described embodiments are part of the embodiments of the present invention, and not all examples. Based on the embodiments of the present invention, all other embodiments obtained by those of ordinary skill in the art without creative work fall within the protection scope of the present invention.

Figure 1:
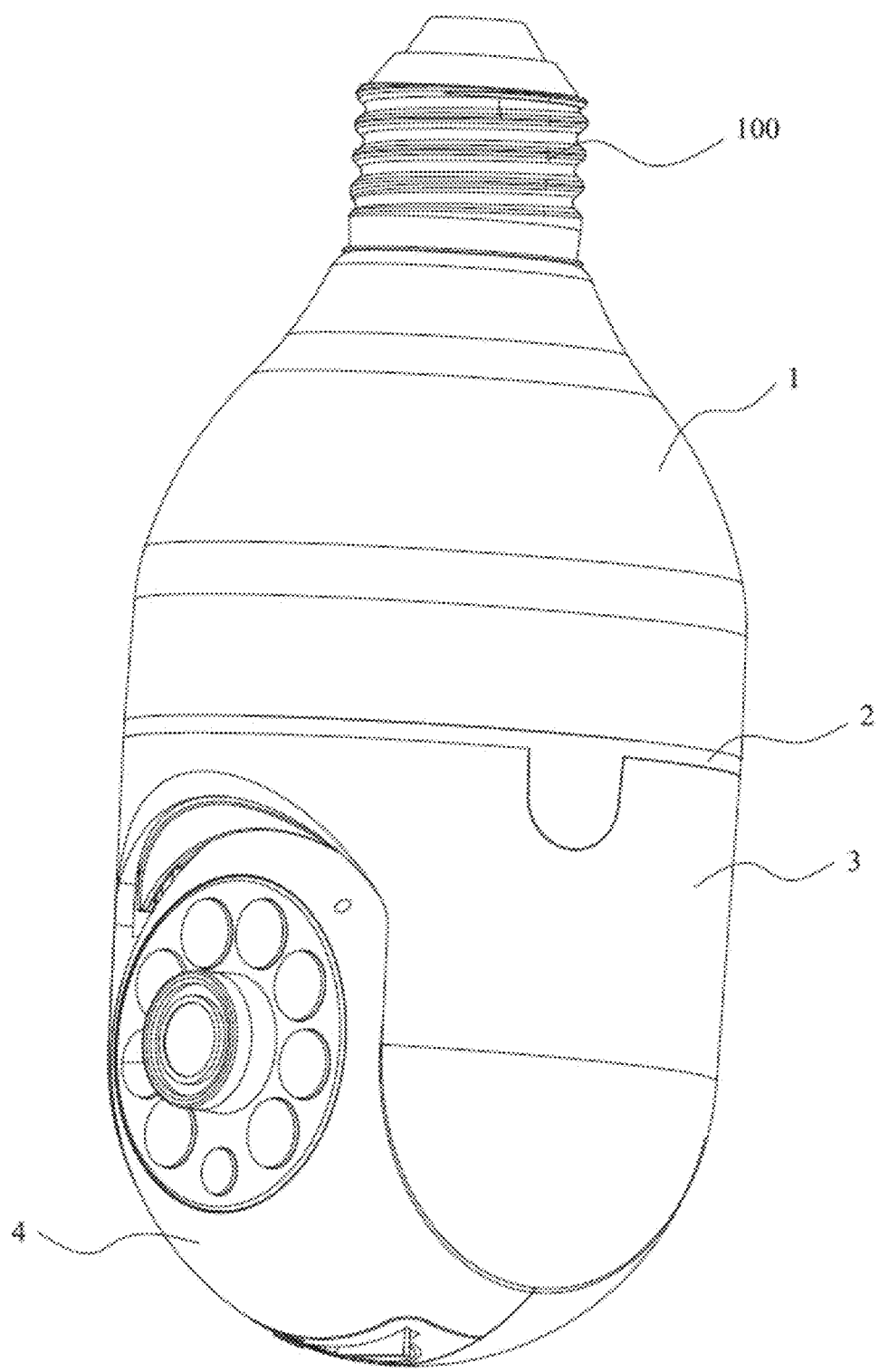
FIG. 1 is a three-dimensional view of a surveillance camera according to Embodiment 1.
Figure 2:
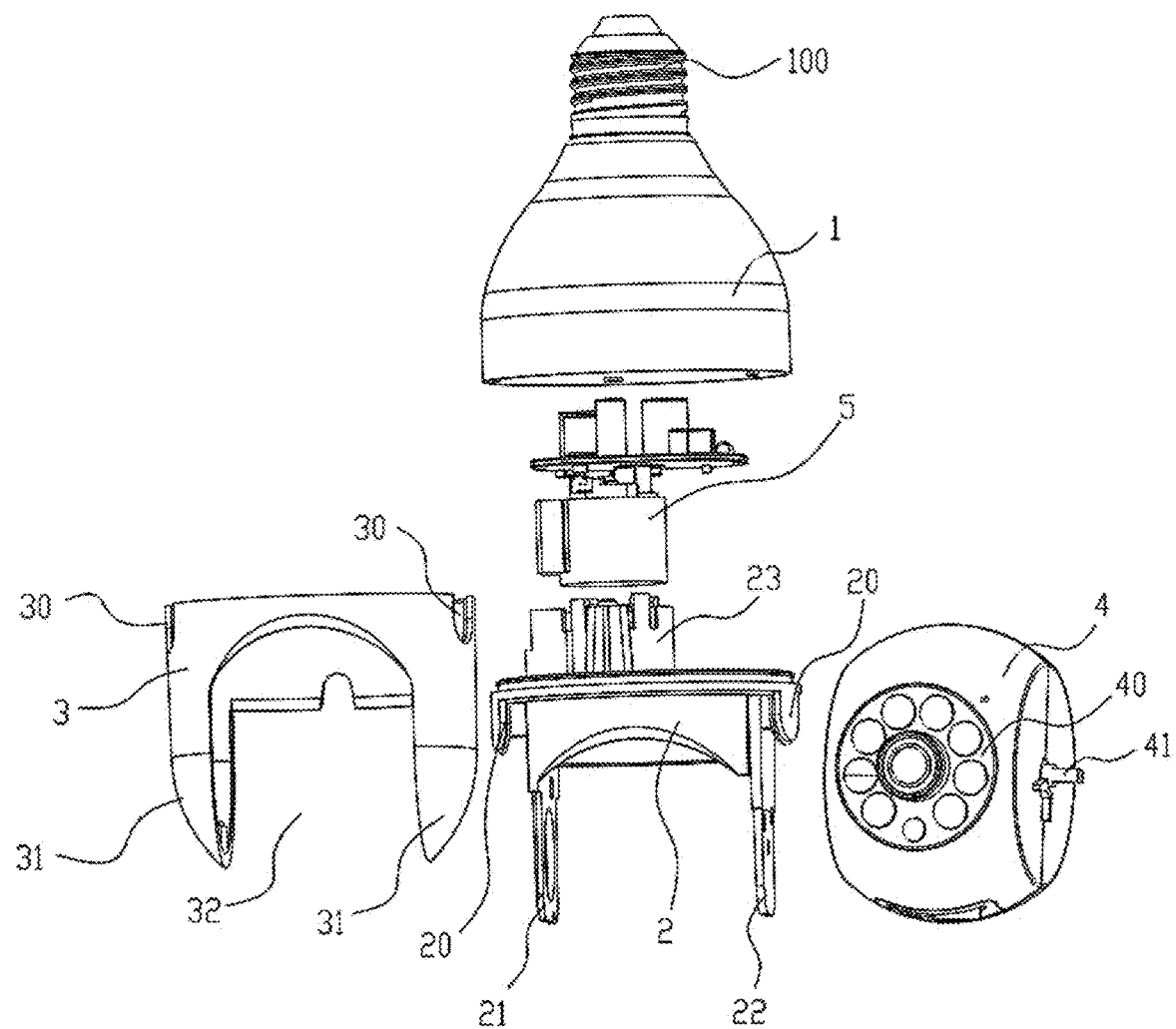
FIG. 2 is an exploded view of a surveillance camera according to Embodiment 1.

The invention is better An omnibearing surveillance camera of embodiment 1: as shown in FIGS. 1 and 2, a lamp cap 1 is included. A power board 50 is arranged in the lamp cap. A threaded interface 100 is connected to an upper end of a lamp base. A mains supply is connected to the power board by the threaded interface, and a voltage of the mains supply is reduced to 5-12 V under the action of the power board. An opening at a lower part of the lamp cap is circular. A rotary bracket 2 and a bracket housing 3 clamped with the rotary bracket are connected to the opening. A ball head 4 is arranged in the bracket housing and is capable of rotating up and down by 360° relative to the bracket housing. A sliding connection device 5 for driving the rotary bracket to rotate relative to the lamp base is further arranged in the lamp base. The rotary bracket rotates under the action of the sliding connection device to drive the ball head to rotate left and right by 360°, such that the ball head is capable of rotating at any angle, and the surveillance range is wider.

Specifically, as shown in FIGS. 2 to 5, protrusions 20 are arranged on left and right sides of the rotary bracket 2, recesses 30 corresponding to the protrusions are provided on the bracket housing, bayonets 200 are provided on the protrusions, and bumps 300 corresponding to the bayonets are arranged at positions of the recesses that face the inside of the bracket housing. After the protrusions are placed into the recesses, the bumps are clamped into the bayonets to implement clamping and locking of the rotary bracket and the bracket housing. In order to conveniently disassemble the rotary bracket 2 and the bracket housing 3 which are clamped and locked, the two protrusions can deform slightly when pressed towards each other, such that the protrusions are separated from the bayonets to disassemble the rotary bracket and the bracket housing. In order to conveniently press the two protrusions towards each other, the two protrusions are preferably arranged at corresponding positions on the diameter of the rotary bracket, or may be arranged at non-corresponding positions. In this case, the disassembly is relatively difficult, but the appearance is more attractive. A left lug 22 is arranged on the rotary bracket 2, a vertical groove 220 is provided in a middle of the left lug, and a rib 31 corresponding to the vertical groove is arranged in the bracket housing 3. The rib is inserted into the vertical groove to facilitate alignment of the rotary bracket and the bracket housing before being clamped and locked. The vertical groove is arranged in a Y shape, such that the rib can be inserted into the vertical groove more easily through an opening part at an upper part of the vertical groove.

Further, as shown in FIGS. 2 to 5, the ball head 4 is arranged in the bracket housing 3 and includes a second motor 41 for driving the ball head to rotate relative to the bracket housing, and a rotating shaft of the second motor is fixed at a bottom of the vertical groove. Therefore, a support plate 221 is arranged at a position of the left lug 22 that gets close to the inside of the rotary bracket, and an arc opening for supporting the rotating shaft of the second motor is provided at an upper end of the support plate. In order to make the connection of the ball head more stable, when the rotating shaft of the second motor is placed in the arc opening on the support plate, an end part thereof extends into the vertical groove, and the rib exactly locks the rotating shaft of the second motor. Therefore, the vertical groove and the rib should meet the requirements that when the rotary bracket is locked to the bracket housing, a gap is still reserved between a lower end of the rib and a lower end of the vertical groove to lock the rotating shaft of the second motor. A right lug 21 is further arranged on the other side of the rotary bracket in a manner of corresponding to the left lug 22, and a through hole 210 connected to the ball head is provided on the right lug.

Figure 3:
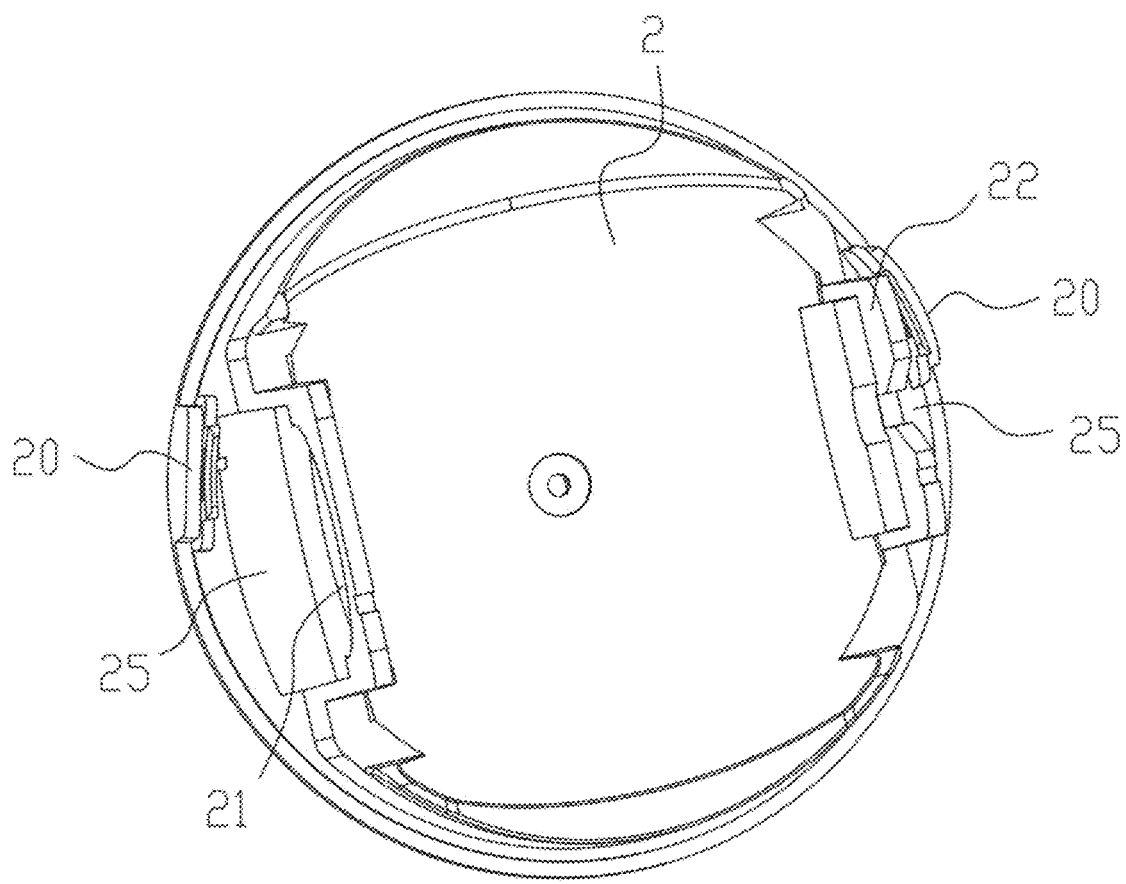
FIG. 3 is a bottom view of a rotary bracket according to Embodiment 1.

Further, as shown in FIG. 3, in order to conveniently cause a connecting wire between the power board and the ball head to pass through the rotary bracket, hollow parts 25 are provided on the rotary bracket 2 and arranged between one protrusion 20 and the left lug 22 and between the other protrusion and the right lug 21. The two hollow parts are arranged between the protrusions and the lugs, such that the two protrusions can be conveniently pressed towards each other to disassemble the rotary bracket and the bracket housing, and the radius of the lug on the rotary bracket is smaller, making it more miniaturized.

Figure 7:
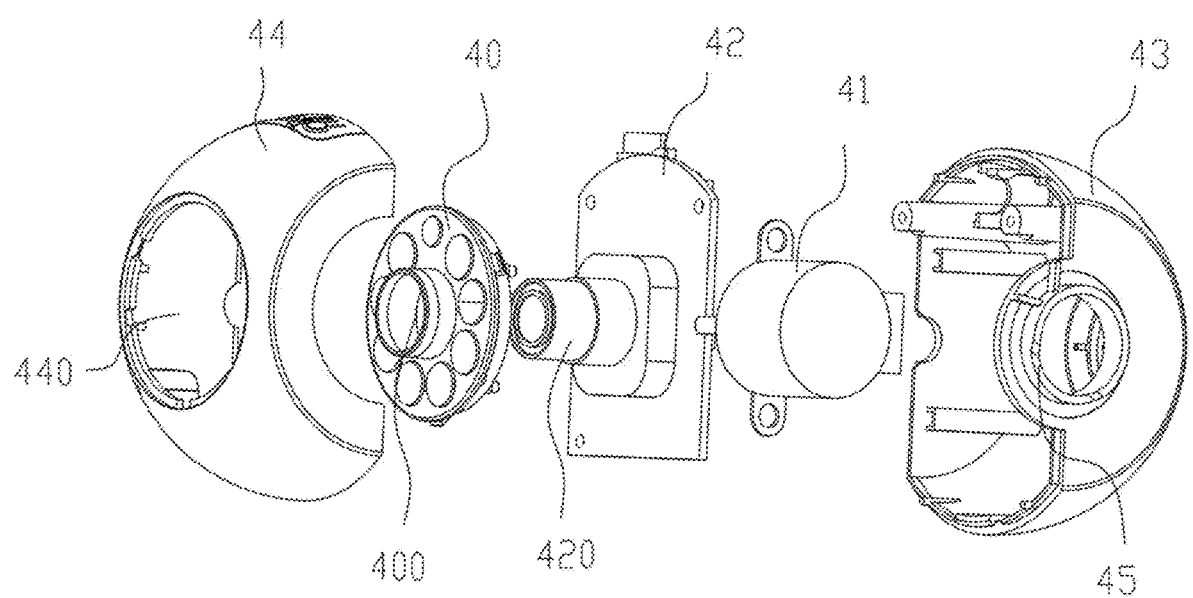
FIG. 7 is an exploded view of a ball head according to Embodiment 1.

Further, as shown in FIG. 7, the ball head 4 includes a ball head front cover 43 and a ball head rear cover 44, where a lamp panel 42 and the second motor 41 for driving the ball head to rotate are arranged in the ball head front cover, a lamp 40 is further arranged in the ball head, the lamp panel 42 is connected to a camera 420, a lamp hole 440 for fixing the lamp is provided on a camera front cover, and a through hole 400 for the camera to pass through is provided in a middle of the lamp, so as to fix the lamp and the camera in the ball head front cover and the ball head rear cover. In this case, the lamp functions to supplement light during surveillance. A rotating part 45 is arranged on one side of the ball head. The rotating part is arranged in the through hole 210 so that the ball head is capable of rotating relative to the rotary bracket. The connecting wire extends into the ball head via the through hole 210 to avoid deflection of the connecting wire when the ball head rotates. The rotating shaft 410 of the second motor extends out of the ball head and is fixed in the vertical groove, such that the ball head is fixed in the bracket housing and is capable of rotating up and down relative to the bracket housing. It is to be noted that when rotating, the rotating shaft of the second motor is required to be stationary relative to the rotary bracket and drives the ball head to rotate, so the rotating shaft of the second motor cannot be selected as cylindrical.

Figure 4:
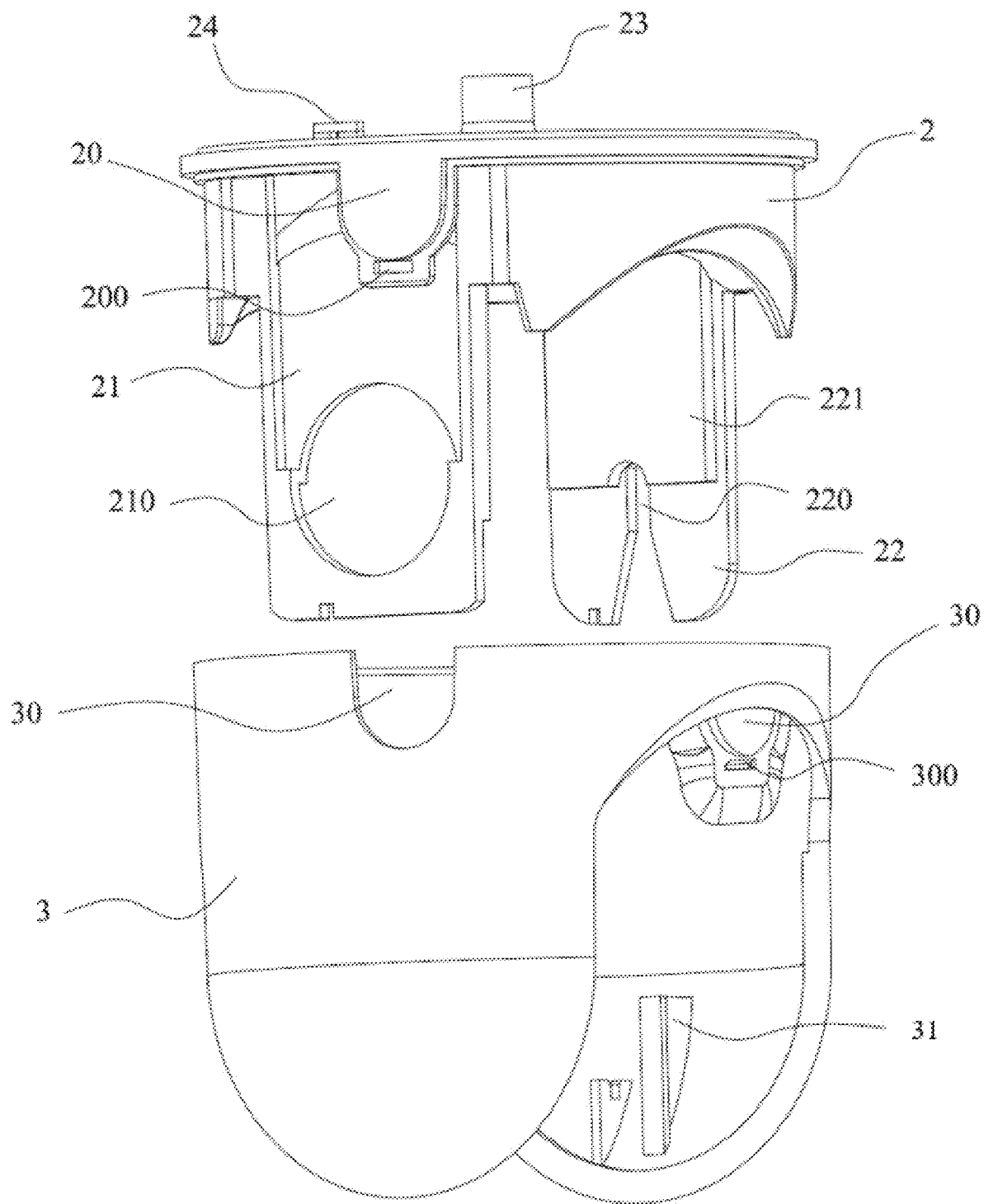
FIG. 4 is a diagram in which a rotary bracket is connected to a bracket housing according to Embodiment 1.
Figure 5:
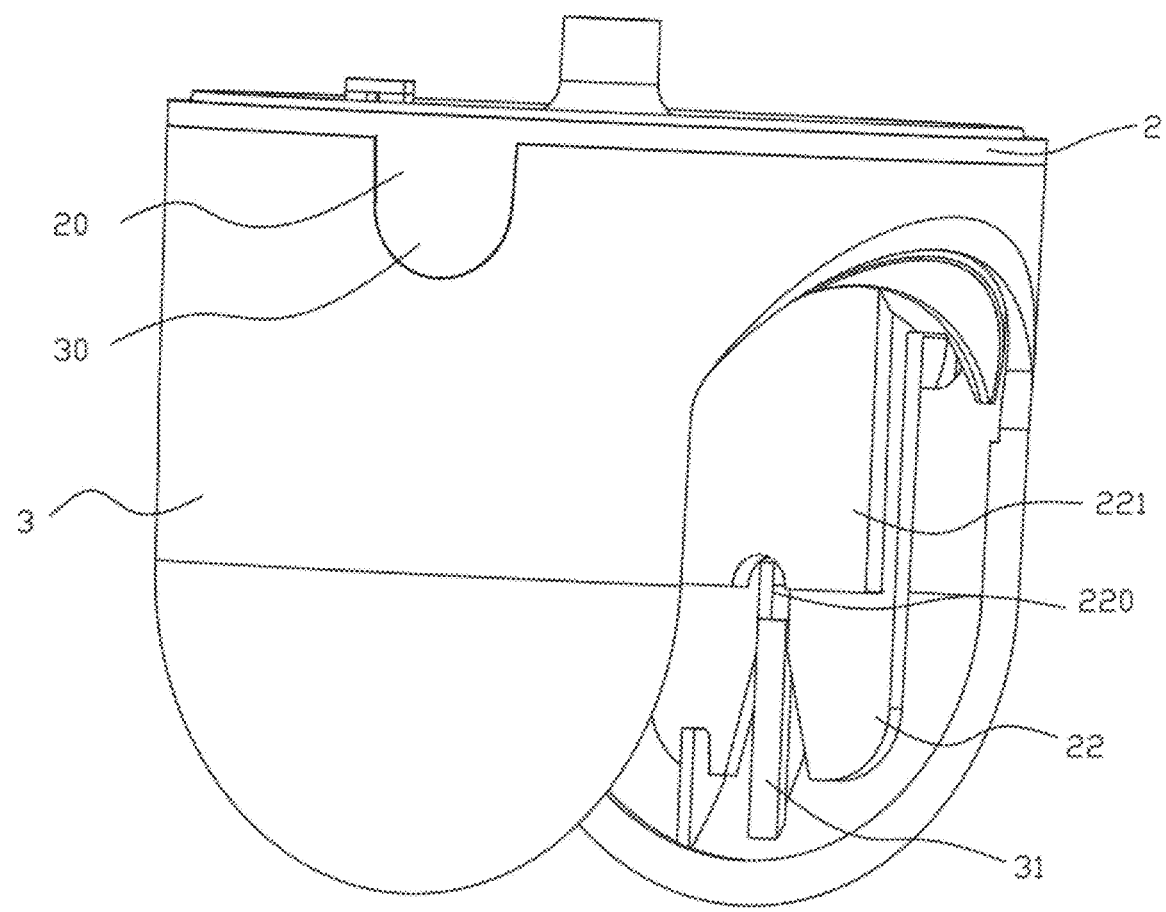
FIG. 5 is a structural diagram of a bracket housing according to Embodiment 1.
Figure 6:
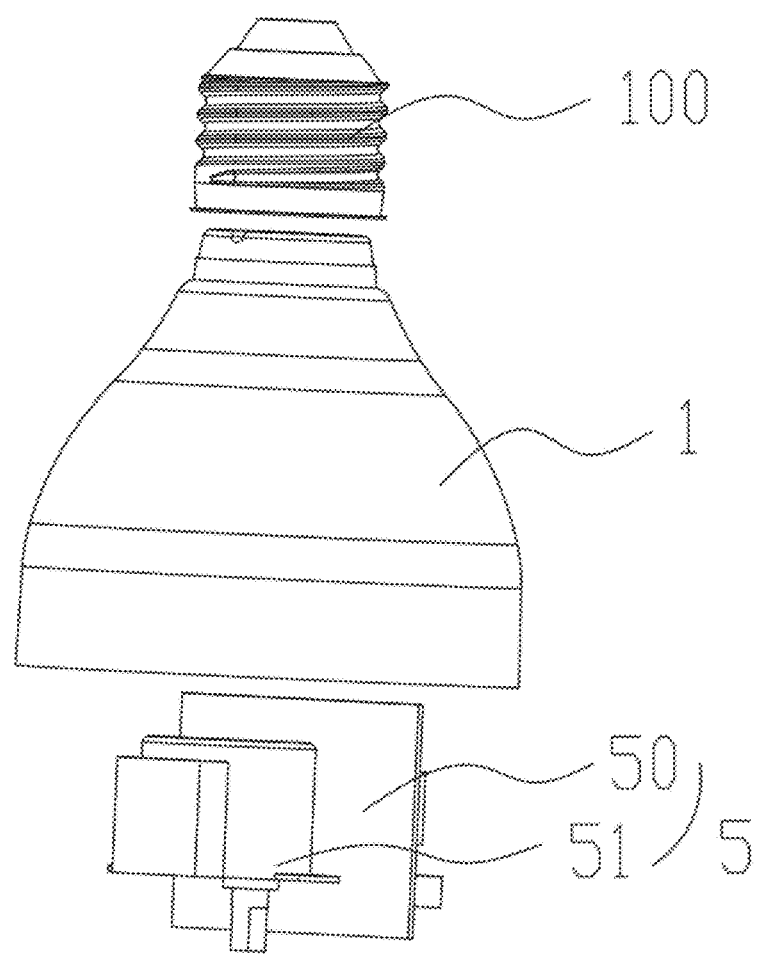
FIG. 6 is a diagram in which a lamp cap is connected to a lamp base and a sliding connection device according to Embodiment 1.

Further, as shown in FIGS. 3 and 4 and FIG. 6, a rotating shaft seat 23 for insertion of a rotating shaft of a first motor is arranged at a bottom of the rotary bracket 2, and a clamping part 24 is further arranged on a side surface of the rotary bracket. The clamping part causes the rotary bracket to infinitely rotate relative to the lamp base. When the first motor operates, the rotating shaft 5100 of the first motor rotates to drive the rotary bracket to rotate relative to the lamp cap, and then drives the ball head to rotate, thereby implementing 360° infinite rotation of the ball head in a left-right direction. It is to be noted that when the rotating shaft of the first motor rotates, the rotary bracket needs to be driven to rotate together to drive the ball head to rotate, so the rotating shaft of the first motor cannot be selected as cylindrical.

During assembly, the rotating part 45 of the ball head is fixed in the through hole 210, the rotating shaft seat of the second motor is placed in the vertical groove 220, the rib 31 is aligned with the vertical groove 220, the protrusions 20 are placed in the recesses 30, and the bumps move down continuously until the bumps 300 are clamped into the bayonets 200. In this case, the rotary bracket 2 is connected to the bracket housing, and the ball head is fixed to the bracket housing. Then, wires of the lamp cap pass through the hollow parts 25 and are connected to the ball head, and the rotary bracket is connected, fixed and locked to the lamp cap, such that the assembly is completed. When the bracket housing and the rotary bracket need to be disassembled, the protrusions are pressed towards each other with both hands to separate the bumps from the bayonets, and then a force is applied upwards to separate the rotary bracket from the bracket housing. In this way of clamping assembly, screws are not needed to lock the rotary bracket and the bracket housing, making it more convenient for assembly and cost-saving.

When in use, the mains supply is connected by the threaded interface, and the voltage of the mains supply is reduced to 5-12 V under the action of the power board. Then, the sliding connection device drives the first motor to operate, the rotating shaft of the first motor drives the rotary bracket to rotate so as to drive the ball head to rotate by 360° in the left-right direction. When the second motor operates, because the rotating shaft of the second motor is clamped in the vertical groove, the rotating shaft of the second motor is relatively stationary and drives the ball head to rotate by 360° in an up-down direction relative to the rotating shaft of the second motor, thereby implementing rotation of the ball head at any angle. Under the control of the power board, omnibearing surveillance is implemented.

Figure 8:
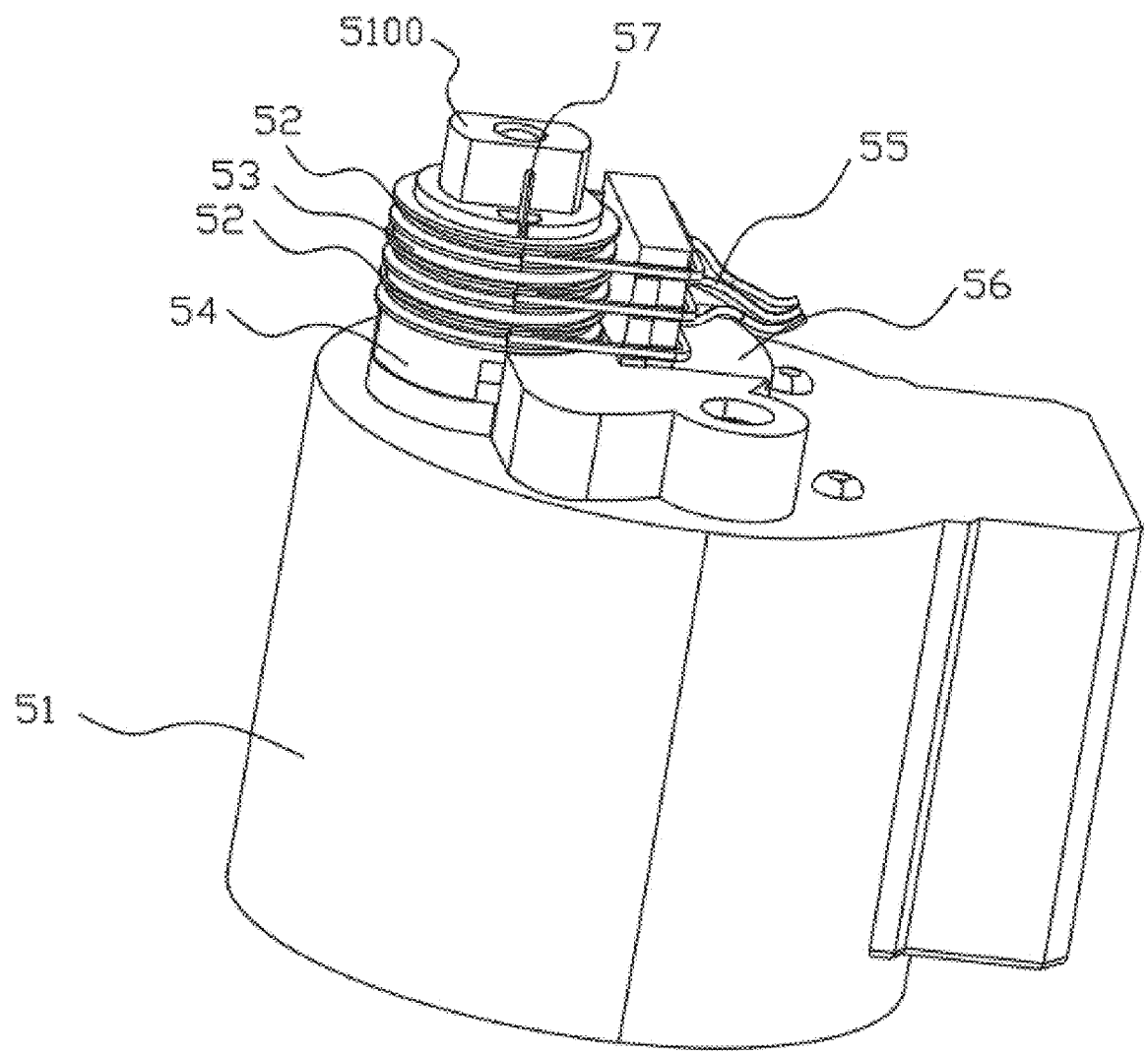
FIG. 8 is a three-dimensional view of a shaft side of a sliding connection device according to Embodiment 1.
Figure 9:
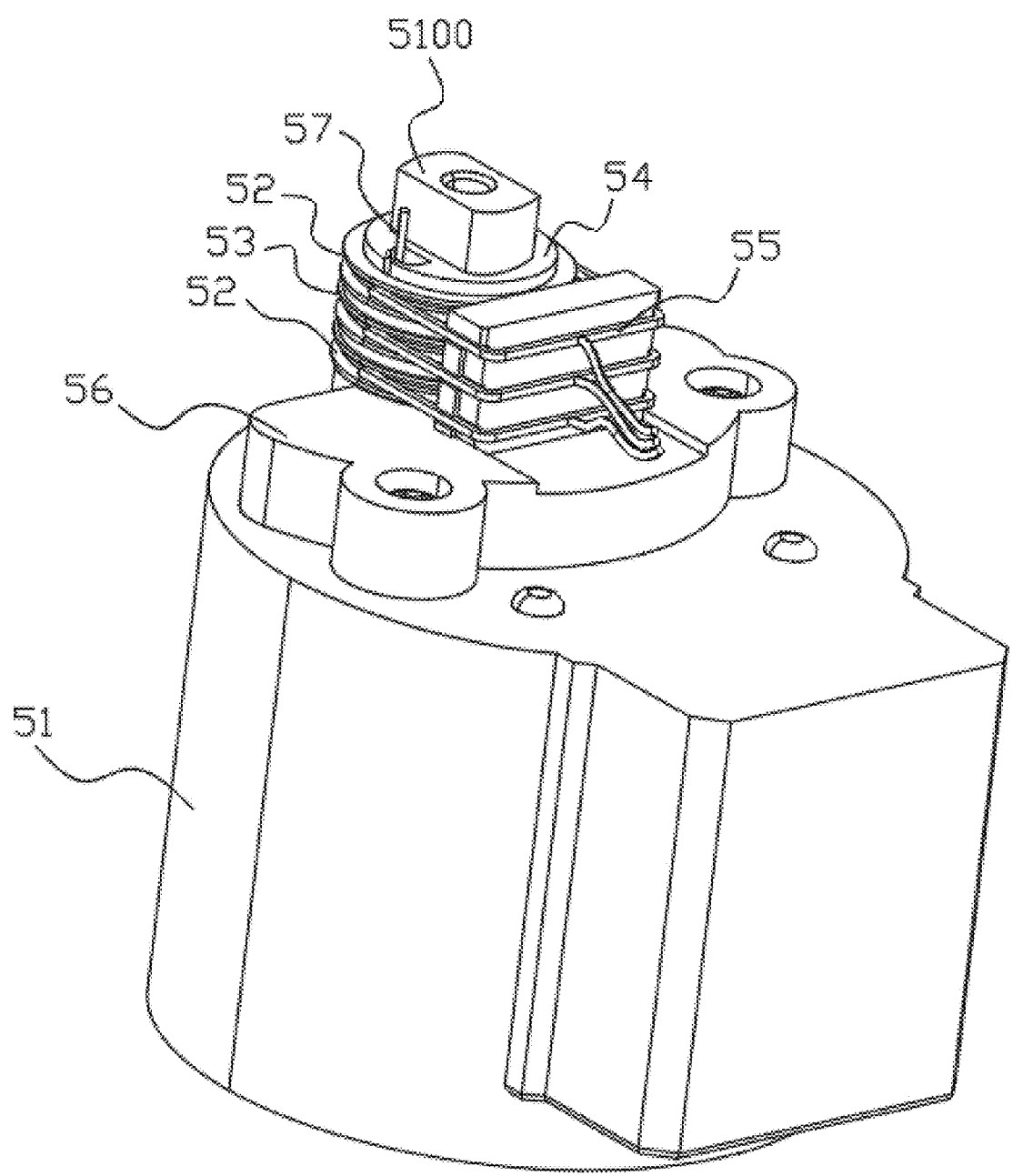
FIG. 9 is a three-dimensional shaft side view of a sliding connection device according to Embodiment 1.
Figure 10:
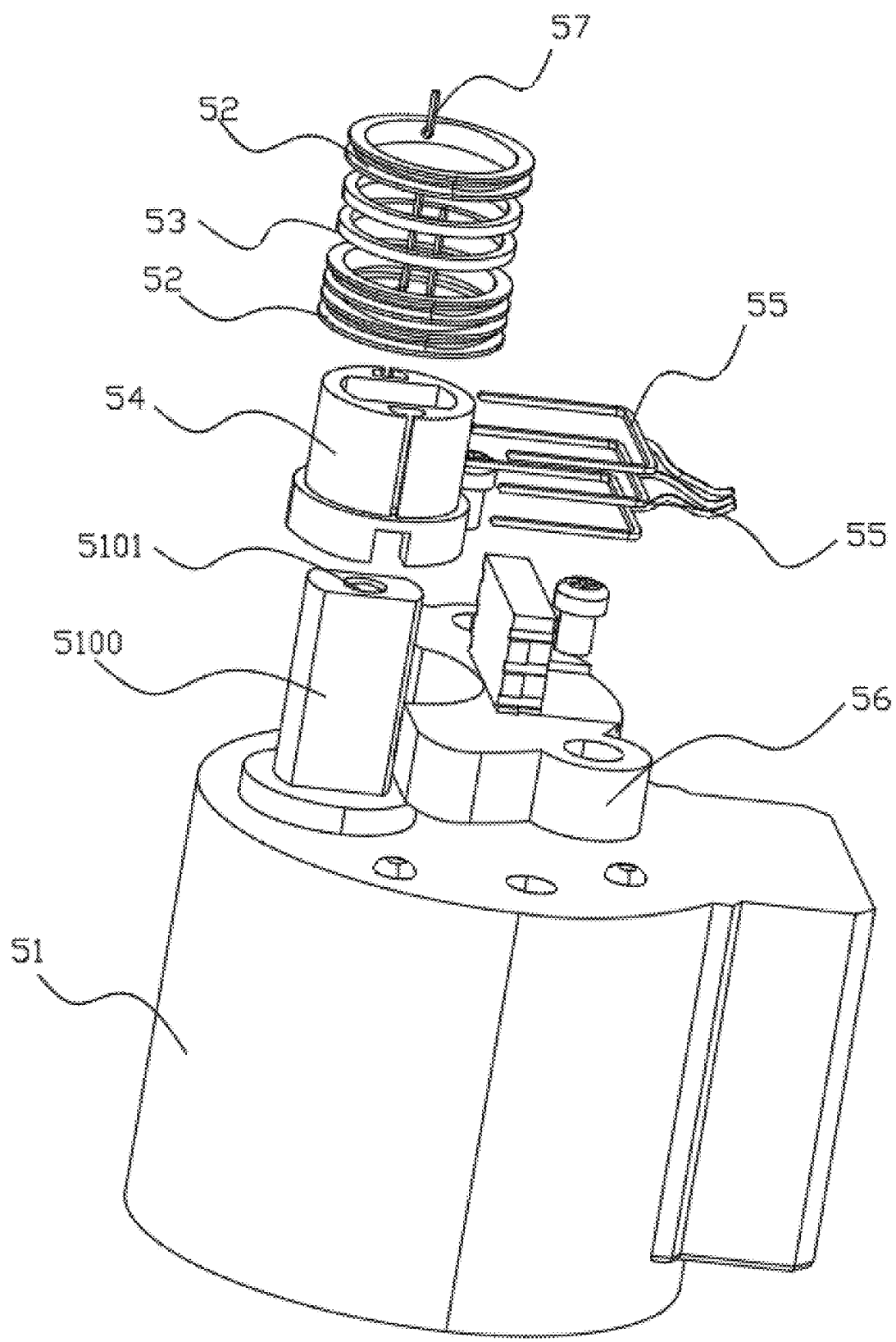
FIG. 10 is an exploded view of a sliding connection device according to Embodiment 1.

Further, in order to facilitate the sliding connection device to drive the camera to rotate infinitely in the left-right direction, as shown in FIGS. 8 to 10, the sliding connection device 5 includes the first motor 51. The rotating shaft 5100 of the first motor that is fixedly arranged at an upper part of the first motor is connected to the power board 50 via a threaded hole 5101 and drives the power board to rotate. A conductive ring base 54 is arranged on an outer side of the rotating shaft of the first motor and sleeved with a plurality of conductive rings 52. An insulating ring 53 is arranged between every two of the plurality of conductive rings. An inner wall of the conductive ring is in contact connection with an input wire 57, and an outer side of the conductive ring is in contact connection with an output wire 55. An external power supply inputs a current by the input wire connected to the power board, a signal is transmitted by the conductive rings, then a control board of the ball head is electrified by the output wire, and the first and second motors are driven to rotate.

Further, as shown in FIGS. 8 to 10 and FIG. 12, the rotating shaft 5100 of the first motor is elliptical, an elliptical rotating shaft insertion cavity 542 corresponding to the rotating shaft of the first motor is provided inside the conductive ring base 54, the conductive ring base is sleeved on the rotating shaft of the first motor and rotates with the rotating shaft, an outer wall of the conductive ring base is cylindrical, the plurality of circular conductive rings 52 are sleeved on the conductive ring base, and the insulating ring 53 is arranged between every two circular conductive rings. The inner wall 521 of the conductive ring is fixedly connected to the input wire 57. Square slots 544 and columnar cavities 543 communicating with the square slots are provided on a side surface of the conductive ring base. The input wire 57 is arranged in the columnar cavity 543 and connected to the power board, and the other end of the input wire passes through the square slot to be fixedly connected to the inner wall of the conductive ring by a fixed connection point 570.

Figure 12:
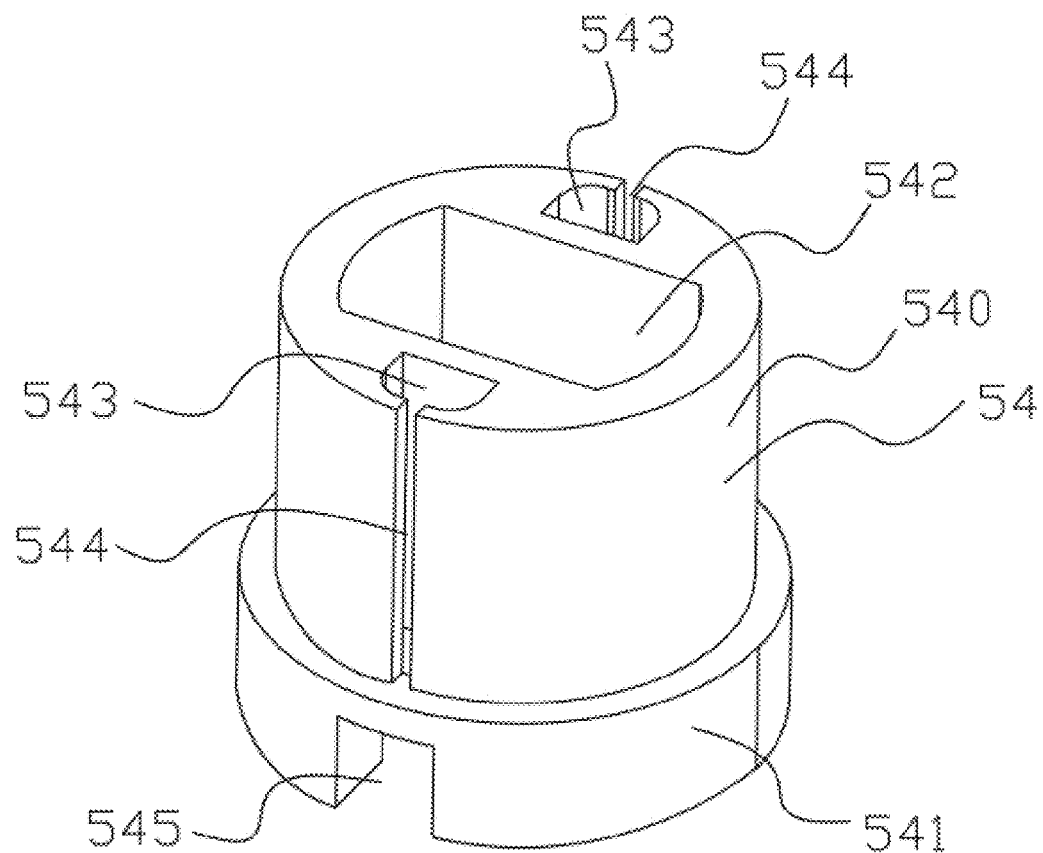
FIG. 12 is a structural diagram of a base of a conductive ring according to Embodiment 1.

Further, as shown in FIG. 12, a conductive ring support part 541 is arranged at a lower end of the conductive ring base 54, and the conductive rings are arranged above the conductive ring support part. In order to avoid short circuits caused by contact between the conductive rings and the rotating shaft, the conductive ring base is made of an insulating material, and a height of an upper end 540 of the conductive ring base is greater than a sum of heights of the plurality of conductive rings and an insulating height. Clamping grooves 545 are further provided on a lower side of the conductive ring support part.

Figure 11:
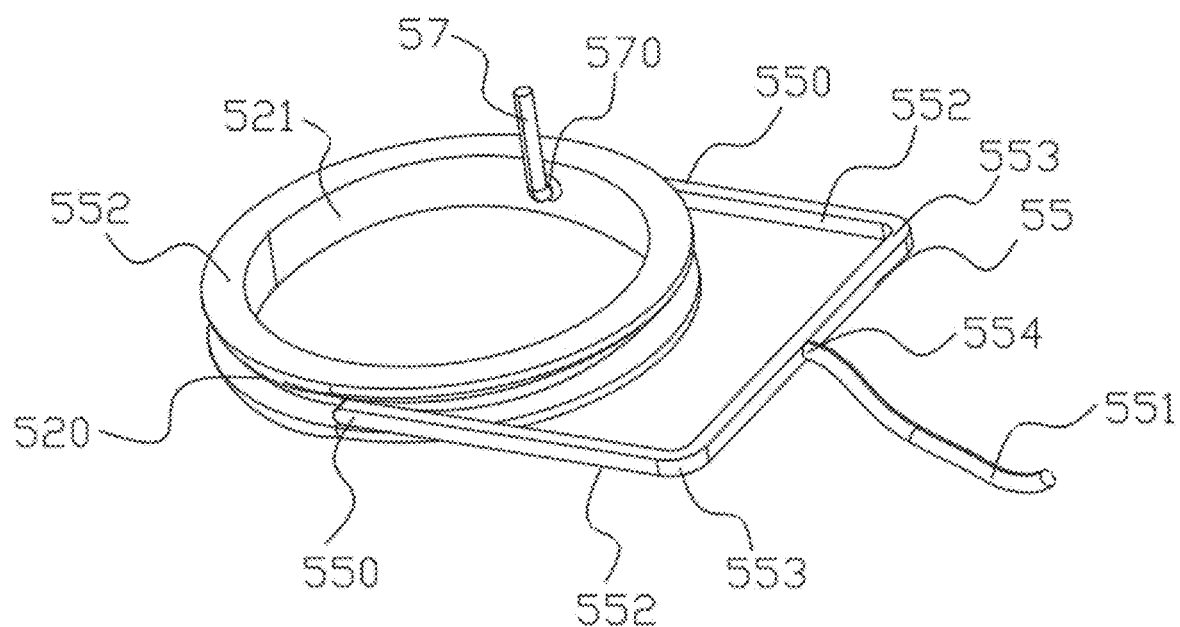
FIG. 11 is a diagram in which a conductive ring is connected to a connecting wire according to Embodiment 1.

Further, as shown in FIG. 11, a sliding groove 520 is provided on an outer wall of the conductive ring 52; the output wire 55 includes two clamping ends 550 in contact connection with the sliding groove, and an output end 551 for transmitting the electrical signal of the conductive ring to the control board; and the two clamping ends generate a certain clamping force on the sliding groove to ensure their contact. In order to enhance the stability of contact between the clamping ends and the sliding groove, the clamping ends are in line contact with the sliding groove.

Figure 13:
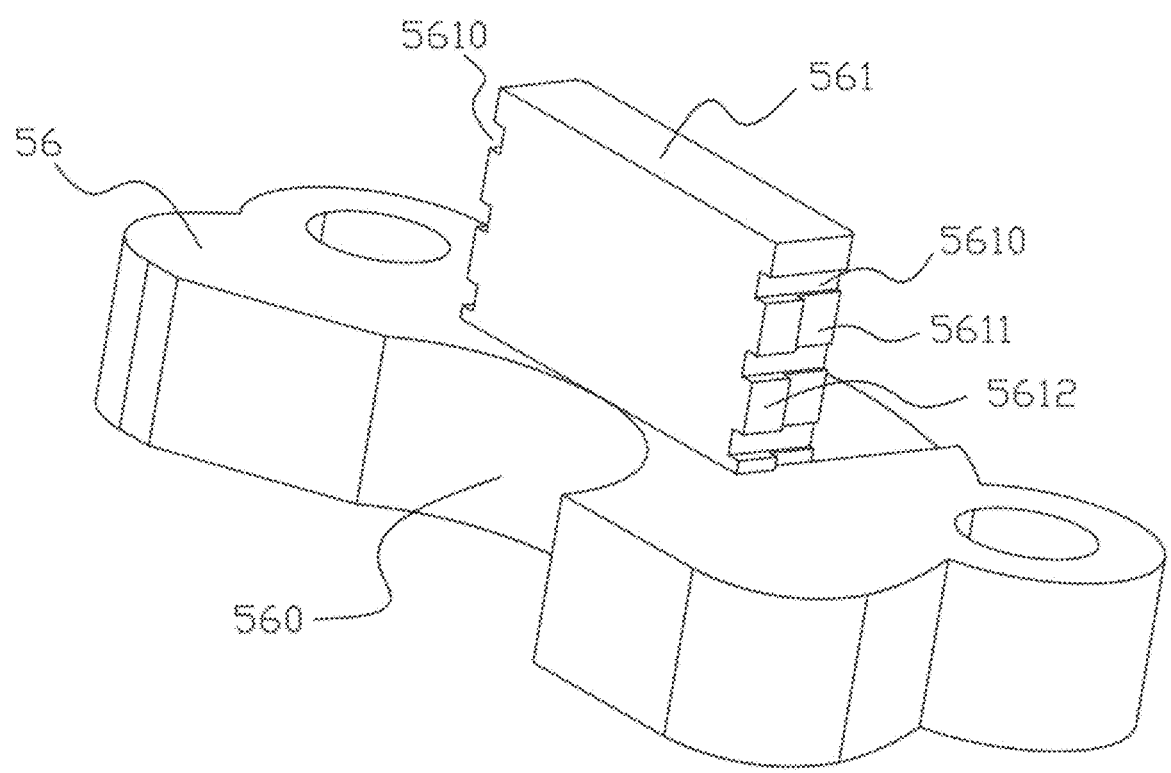
FIG. 13 is a structural diagram of a fixing bracket according to Embodiment 1.

Further, as shown in FIG. 11 and FIG. 13, in order to enhance the stability of the output wires, the sliding connection device further includes a fixing bracket 56, where an arc-shaped surface in contact with the conductive ring base 54 and an output wire fixing bracket 561 for fixing the output wire are arranged on one side of the fixing bracket; the output wire further includes fixed ends 552 and bent ends 553 which are integrally formed with the clamping ends; wire clamping grooves 5610 and first bosses 5611 for preventing the fixed ends from moving up and down are provided on the output wire fixing bracket in a manner of corresponding to the fixed ends; second bosses 5612 lower than the first bosses are arranged on side surfaces of the first bosses; the bent ends are capable of moving up and down slightly at the second bosses; a closure end 554 is arranged behind the two bent ends; and the electrical signal is outputted by the output end 551. The clamping force between the two clamping ends ensures the stability of connection between the output wire and the conductive ring. The electrical signal is transmitted by the common output end, making it more stable for electrical signal transmission.

Further, as shown in FIGS. 8 to 10, there are three or more conductive rings 52, and the insulating ring 53 is arranged between every two conductive rings, where two conductive rings are used as two ends of the power supply to transmit the electrical signal to the control board for supplying power, and third and other conductive rings can be used as function extension ports to implement other external functions. Specific functions depend on functions of the control board, and it is more convenient for function extension. For example, a counting function may be used for the third conductive ring, that is, the number of rotations of the conductive ring is counted to calculate the number of rotations of the rotating shaft of the motor, so as to calculate a rotation angle of the camera. A partial insulating part may be arranged on the third conductive ring. In this case, only one clamping end 550 needs to be provided. The clamping end keeps in contact with the conductive ring. When the conductive ring rotates, the clamping end keeps in communication with the conductive ring. When the conductive ring rotates to the insulating part, a third functional wire is disconnected. After continuous rotation, the clamping end is in contact with the conductive ring to electrify the third functional wire. The control board determines the number of rotations based on electrification and diselectrification of the third functional wire, and then a specific rotation angle of the sliding connection device can be calculated, which facilitates resetting. An insulating protrusion may also be arranged on the third conductive ring. In this case, an end part of the clamping end 50 should be set to be in an outward protruding arc shape. When the conductive ring rotates and the insulating protrusion is in contact with the clamping end, the insulating protrusion exerts a thrust on the clamping end so that the clamping end slides onto the insulating protrusion and generates a pressing force on the insulating protrusion. At this time, the third functional wire is disconnected. After the conductive ring continues to rotate, the thrust of the insulating protrusion on the clamping end disappears. The clamping end presses the conductive ring under its own elastic force to electrify the third functional wire. The control board determines the number of rotations based on electrification and diselectrification of the third functional wire, and then a specific rotation angle of the sliding connection device can be calculated, which facilitates resetting. By arranging the insulating protrusion and the conductive ring in the outward protruding arc shape, the stability of counting is enhanced. The counting here is not required to be accurate, so completely accurate contact between the clamping end and the conductive ring is not needed. The control board determines the number of rotations of the third functional wire based on a duration for which electrical signal transmission for the third functional wire is disabled. A specific duration is set according to actual requirements and is not described in detail here. When the duration of electrical signal transmission for the third functional wire is less than a set value, the contact may be an instantaneous poor contact, so it is not determined that the third functional wire rotates a full circle, and only when the duration of electrical signal transmission for the third functional wire is greater than the set value, it is determined that the third functional wire rotates a circle. A specific determined duration can be calculated and set according to a width of the insulating part and a rotational speed of the rotating shaft of the motor.

When the sliding connection device is in use, the external power supply is connected to the power board by the threaded interface 100, and the electrical signal is transmitted by the conductive ring 52 through the input wire 57 and then is transmitted to the control board through the output wire 55 to electrify the control board. When the rotating shaft 5100 of the first motor starts to rotate, due to the elliptical design of the rotating shaft of the first motor, the conductive ring base rotates with the rotating shaft of the motor. Because one end of the input wire is arranged in the columnar cavity 543, the input wire also rotates with the rotating shaft of the first motor. In this case, the fixed connection point 570 of the input wire drives the conductive ring to rotate and keeps in sliding contact with the conductive ring and the clamping end of the connecting wire. It is realized that the electrical signal is transmitted to the conductive ring after the rotating shaft of the motor rotates and is transmitted from the clamping end 550 in contact with the conductive ring to the output end 551, and then the control board is electrified. It is realized that the motor drives the sliding connection device to rotate at any angle. Moreover, the number of rotations of the motor is calculated based on a duration for which electrical signal transmission for a counting device is disabled and a frequency of disabling electrical signal transmission, which facilitates resetting of the sliding connection device.

In order to improve the universality of the sliding connection device, the electrical signal may be connected to the power board by the output end 551, then transmitted from the clamping end 550 to the conductive ring 52, and then transmitted to the input wire 57 for electrical signal transmission, which achieves dual purposes of electrical signal transmission. The above solution can be used for transmission of current signals, pulse signals, and other types of electrical signals. Moreover, other similar signals may also be transmitted.

Figure 14:
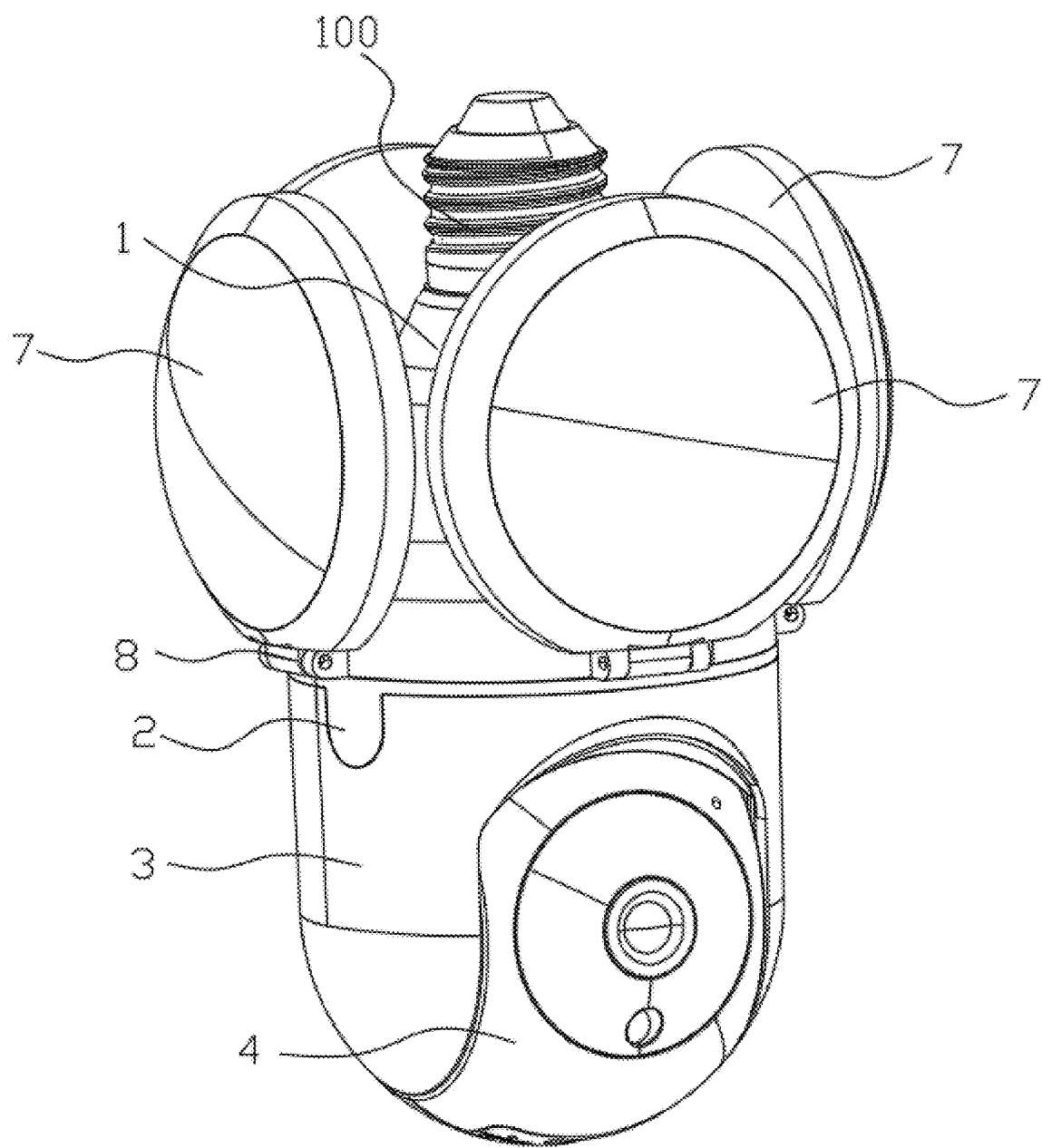
FIG. 14 is a three-dimensional view of a surveillance camera with folding lighting devices according to Embodiment 1.
Figure 15:
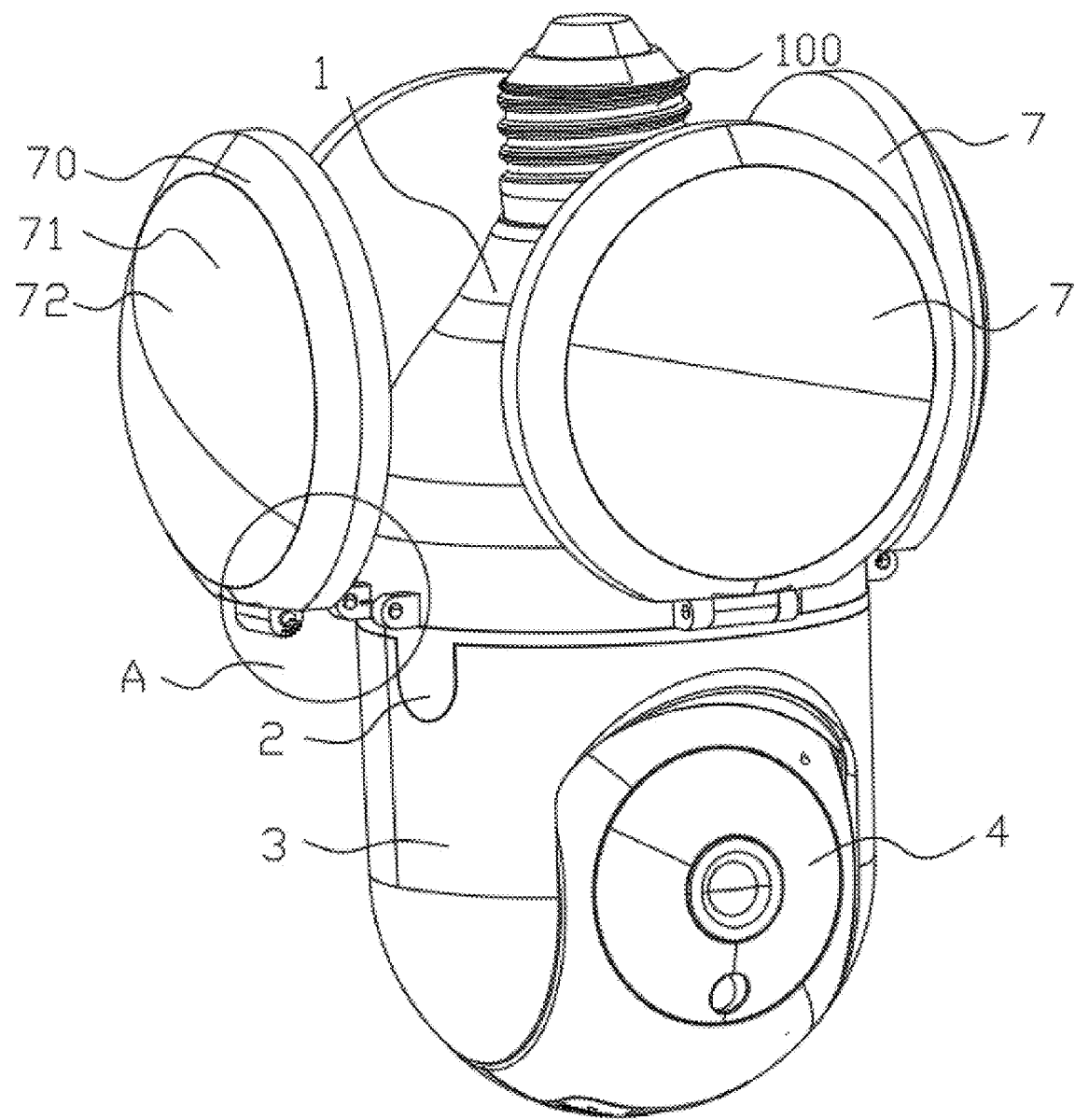
FIG. 15 is a partial exploded view of a surveillance camera with folding lamps according to Embodiment 1.

Further, as shown in FIGS. 14 and 15, four lighting devices 7 are further arranged outside the lamp cap. The lighting devices are connected to the lamp base by a rotating mechanism 8, such that the surveillance camera achieves a lighting effect. It is to be noted that in a power supply mode, the threaded interface may be replaced with a socket for supplying power to the surveillance camera, that is, one end of the lamp base is connected to the power supply for supplying power to the surveillance camera.

Figure 16:
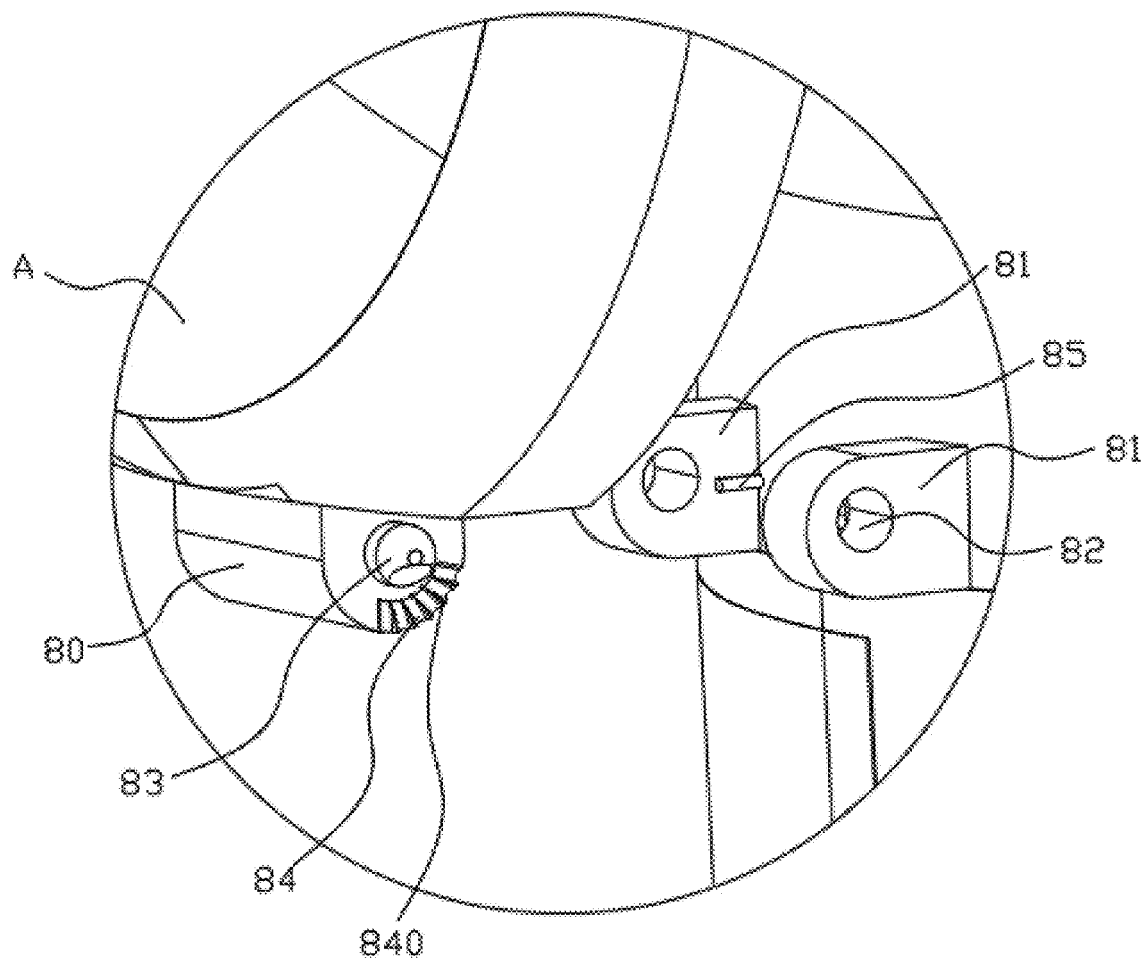
FIG. 16 is an enlarged view of A in FIG. 15 according to Embodiment 1.
Figure 17:
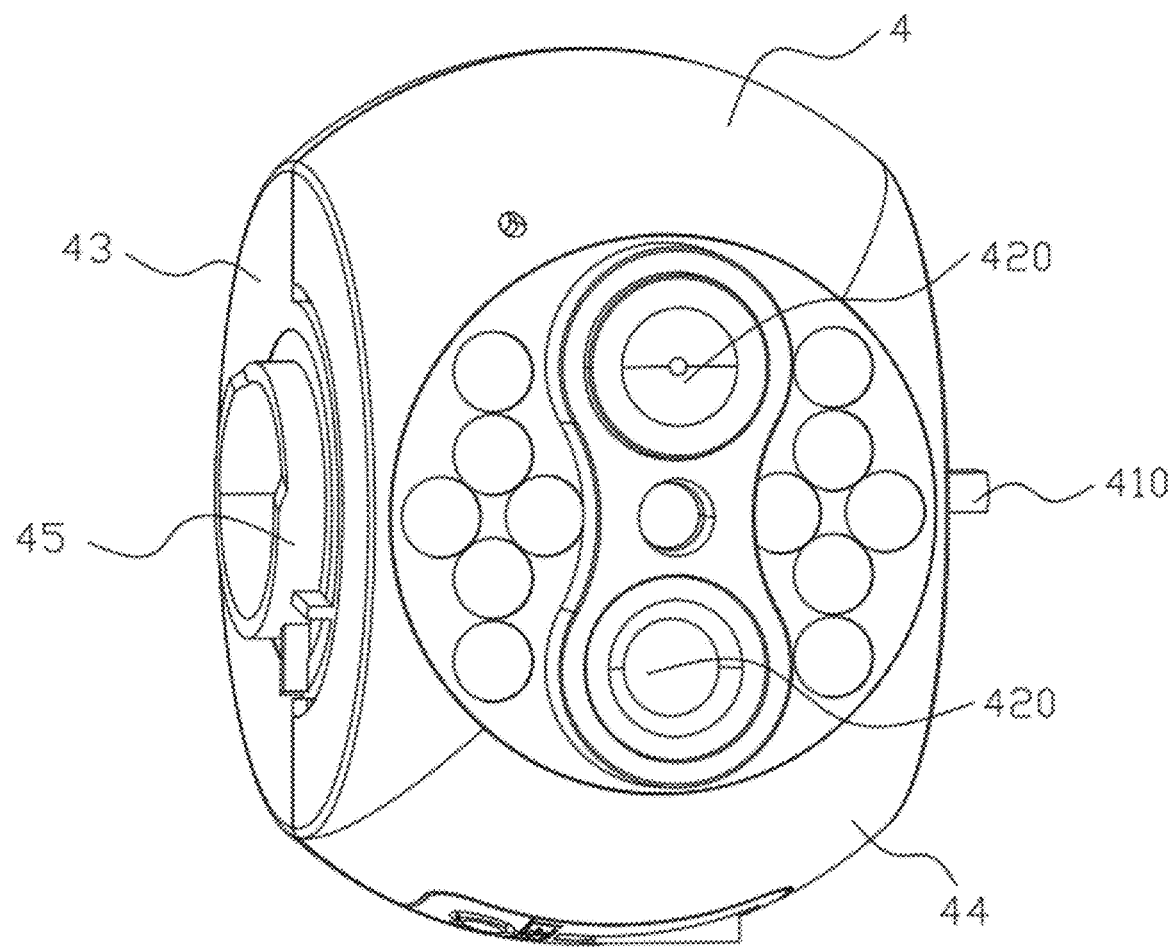
FIG. 17 is a shaft side view of a ball head according to Embodiment 2.
Figure 18:
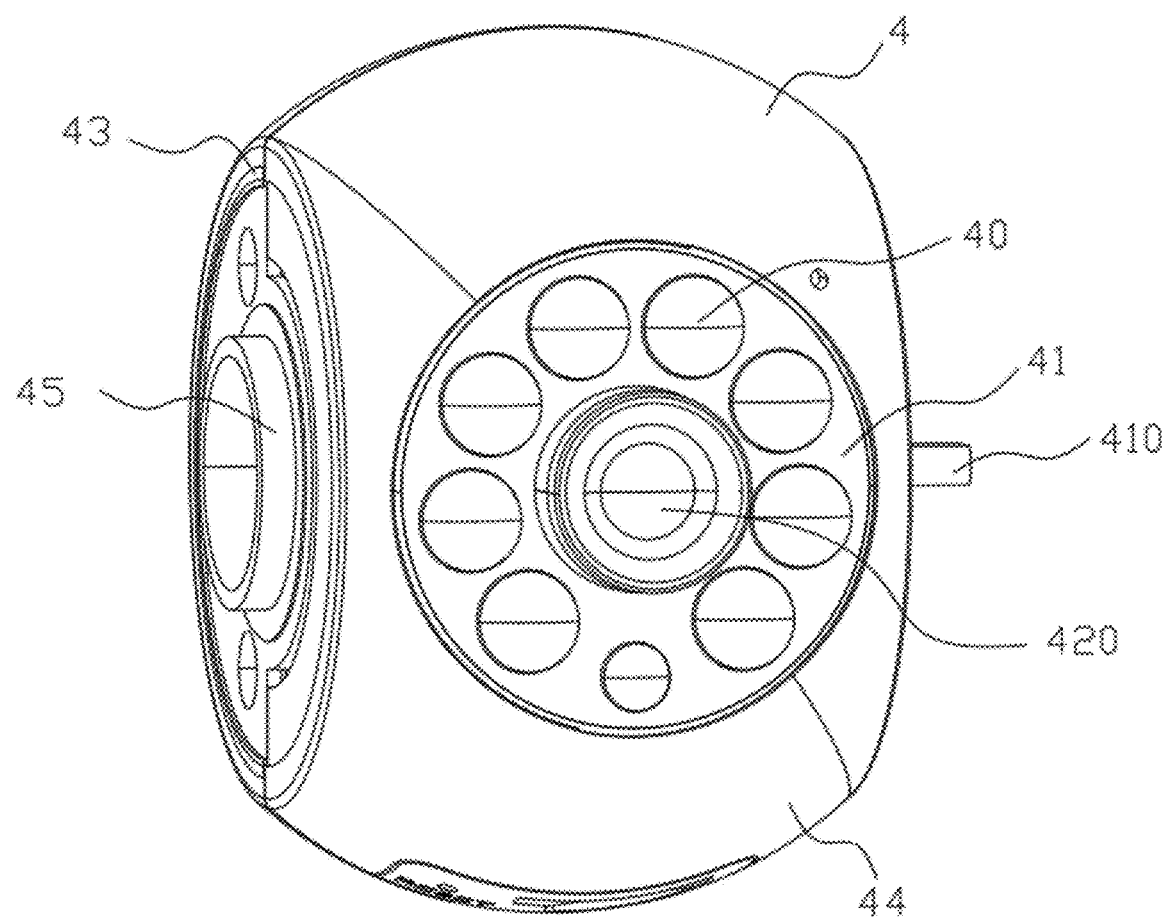
FIG. 18 is a shaft side view of a ball head according to Embodiment 3.
Figure 19:
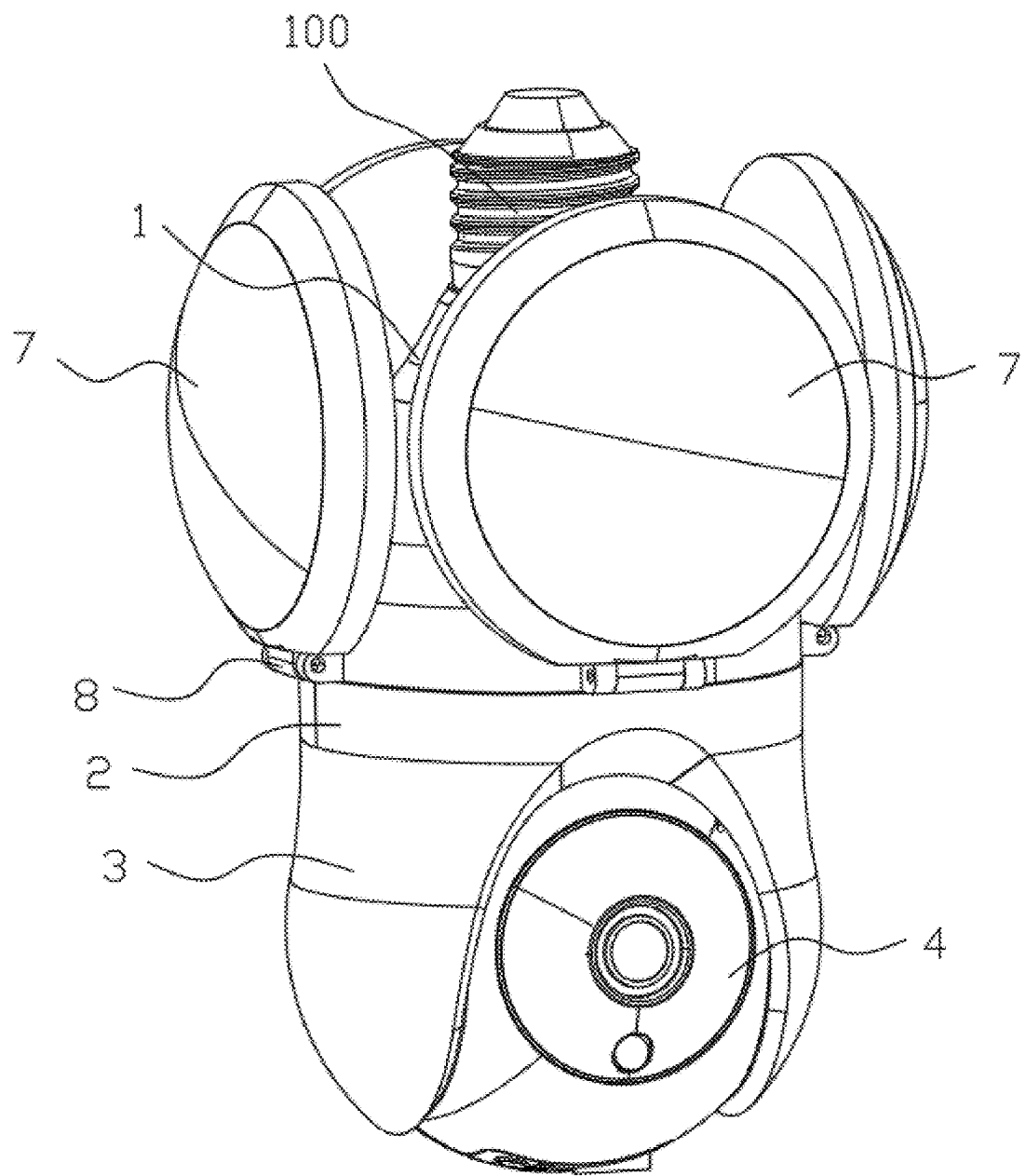
FIG. 19 is a three-dimensional view of a surveillance camera with folding lighting devices according to Embodiment 4.

Further, as shown in FIGS. 15 and 16, the lighting device 7 includes a lamp housing 70 and a lighting lamp 71 arranged in the lamp housing, where the lighting lamp is sleeved with a lampshade 72. The plurality of lighting devices are evenly distributed outside the lamp cap. A lower end of the lamp housing is connected to the lamp cap by the rotating mechanism 8. The rotating mechanism includes a connecting column 80 fixedly arranged on the lamp housing, where a rotating shaft 83 is arranged at two ends of the connecting column, two connecting lugs 81 are arranged outside the lamp cap in a manner of corresponding to the connecting column, and rotating holes 82 are provided on the connecting lugs. The rotating shaft is inserted into the rotating holes, and the connecting column is placed between the two connecting lugs, so as to implement rotation of the lighting device relative to the lamp cap. When the lighting device is arranged parallel to the lamp cap, storage and transportation are facilitated, and space is saved. The lighting device is unfolded to form an angle of less than 90° with the lamp cap, such that the lighting device is in use when unfolded.

Further, as shown in FIG. 16, in order to facilitate unfolding of the lighting device 7, travel grooves 84 are provided on two sides of the connecting column 80, and travel teeth 85 are arranged on inner walls of the connecting lugs in a manner of corresponding to the travel grooves. Rotation of the travel teeth in the travel grooves causes the angle between the lighting device and the lamp cap to be 0-90°. That is, when the travel teeth are placed at end parts of the travel grooves, the lighting device is perpendicular or parallel to the lamp cap. A plurality of angular grooves 840 are further provided in the travel groove. When the travel teeth are placed in the angular grooves, the angle between the lighting device and the lamp cap is fixed, such that the lighting device can only rotate within a set angle, and the angular grooves cause the lighting device to keep unfolded at a fixed angle.

When the lighting device 7 is used, the mains supply is connected by the threaded interface, and the voltage of the mains supply is reduced to 5-12 V. Then, the first motor 51 is driven to operate, the rotating shaft of the first motor drives the rotary bracket to rotate so as to drive the ball head to rotate by 360° in the left-right direction. When the second motor operates, because the rotating shaft of the second motor is fixed in a rotating shaft fixing hole of the second motor, the rotating shaft of the second motor is relatively stationary and drives the ball head to rotate by 180° in the up-down direction relative to the rotating shaft of the second motor, thereby implementing rotation of the ball head at any angle. Moreover, the lighting device also provides sufficient brightness for surveillance and also achieves the lighting effect. In this way, the use is more convenient, and the surveillance is securer.

Figure 20:
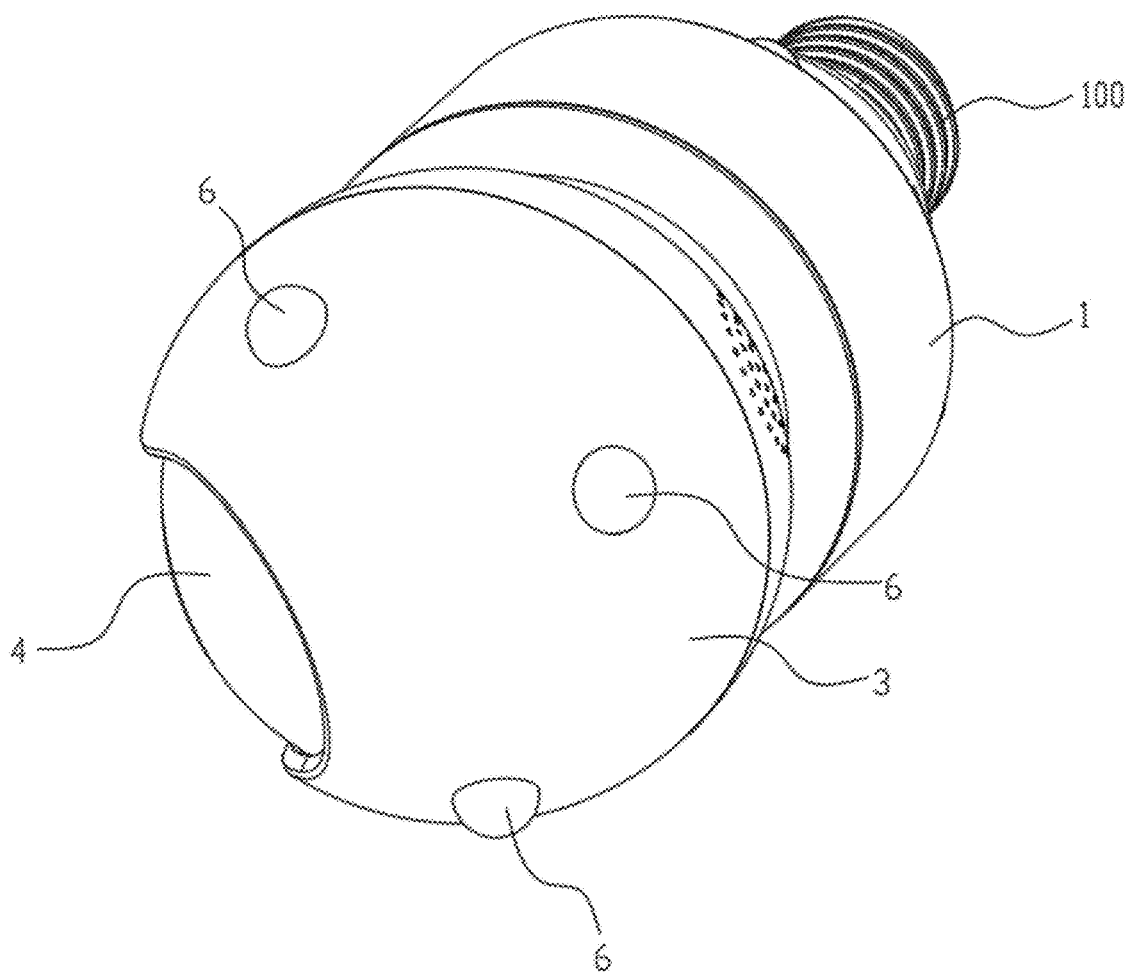
FIG. 20 is a bottom view of a surveillance camera (without lighting devices) according to Embodiment 4.

The invention is better An omnibearing surveillance camera of embodiment 2: as shown in FIG. 20, the difference from Embodiment 1 is that an infrared thermal imager is replaced with the camera 420 to implement dual-camera surveillance, where one camera is used as a panoramic camera for preliminary surveillance, and the other cameras is used as a high-definition camera for accurate surveillance. When an action in a direction is monitored by the panoramic camera, the motor is driven to rotate to implement accurate surveillance by the high-definition camera.

Figure 21:
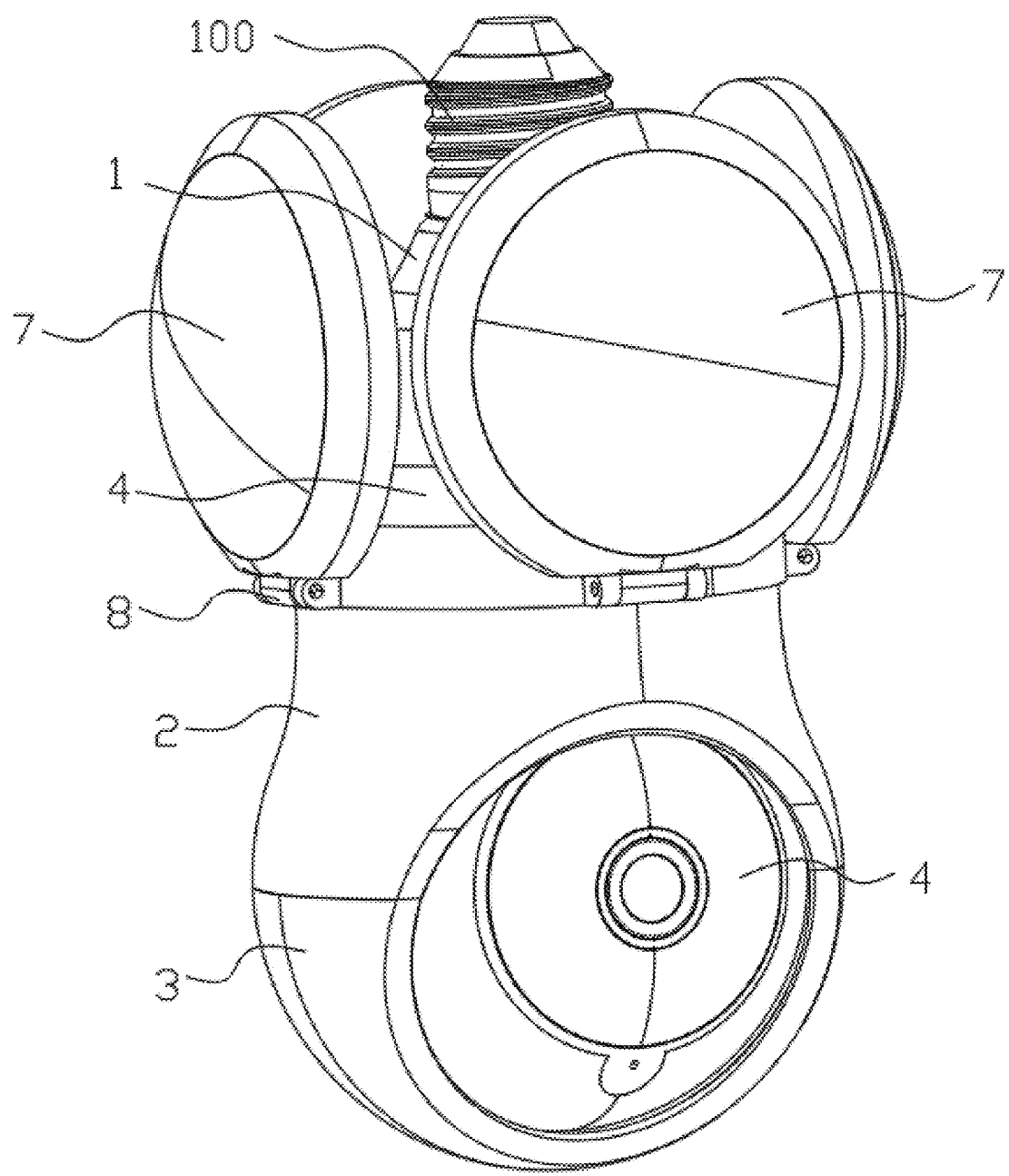
FIG. 21 is a three-dimensional view of a surveillance camera with folding lighting devices according to Embodiment 5.

The invention is better An omnibearing surveillance camera of embodiment 3: as shown in FIG. 21, the difference from Embodiments 1 and 2 is that the infrared thermal imager or the panoramic camera is replaced with a lamp 40 by which a distant place is illuminated. In this case, the surveillance camera should be in an operating state of rotation, that is, the surveillance camera keeps rotating irregularly. When an action in a direction is monitored, the surveillance camera stops to perform long-time surveillance or reminding. Specific time depends on background setting and is not described in detail here.

Figure 22:
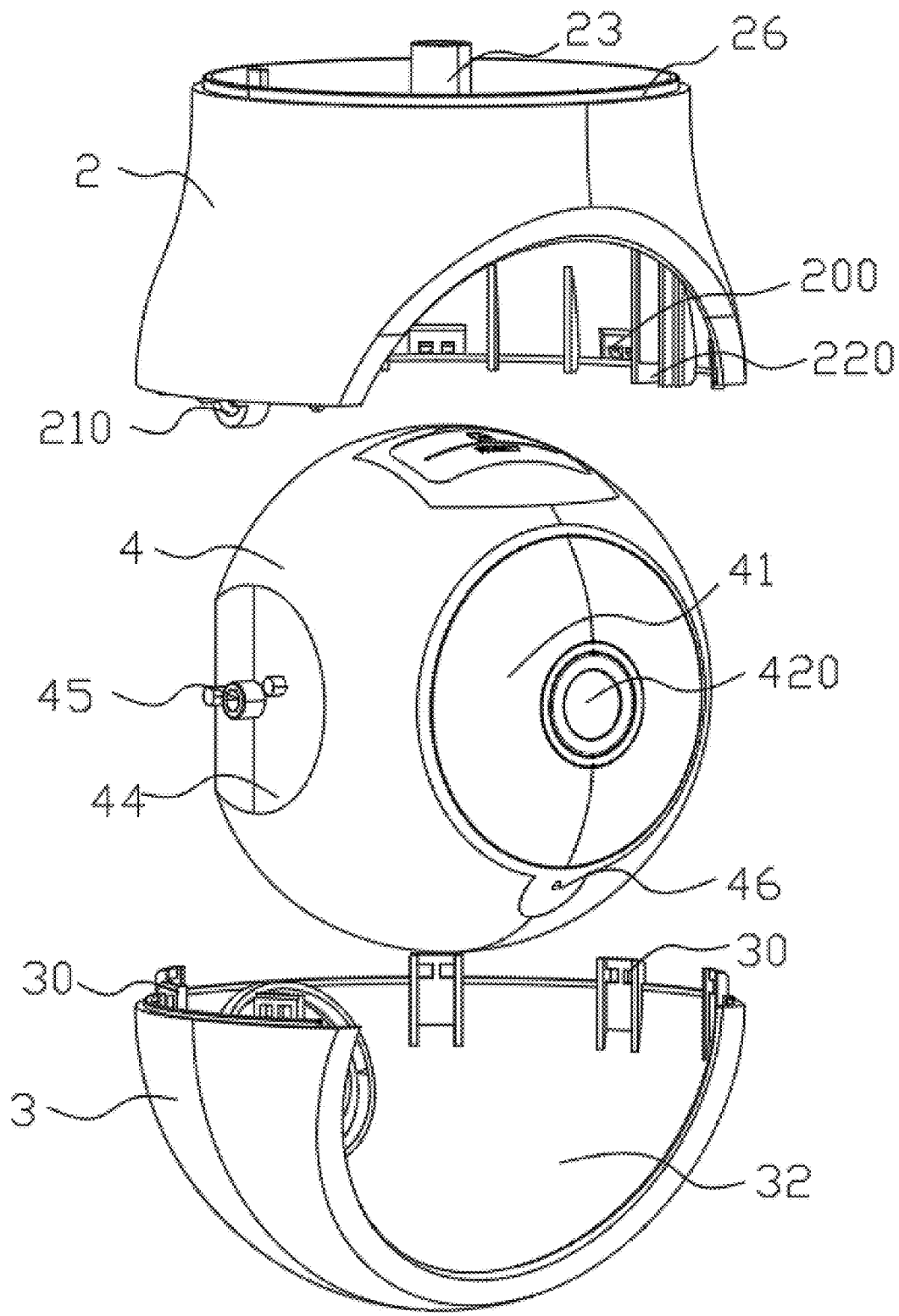
FIG. 22 is an exploded view of a surveillance camera (without a lamp base) according to Embodiment 5.
Figure 23:
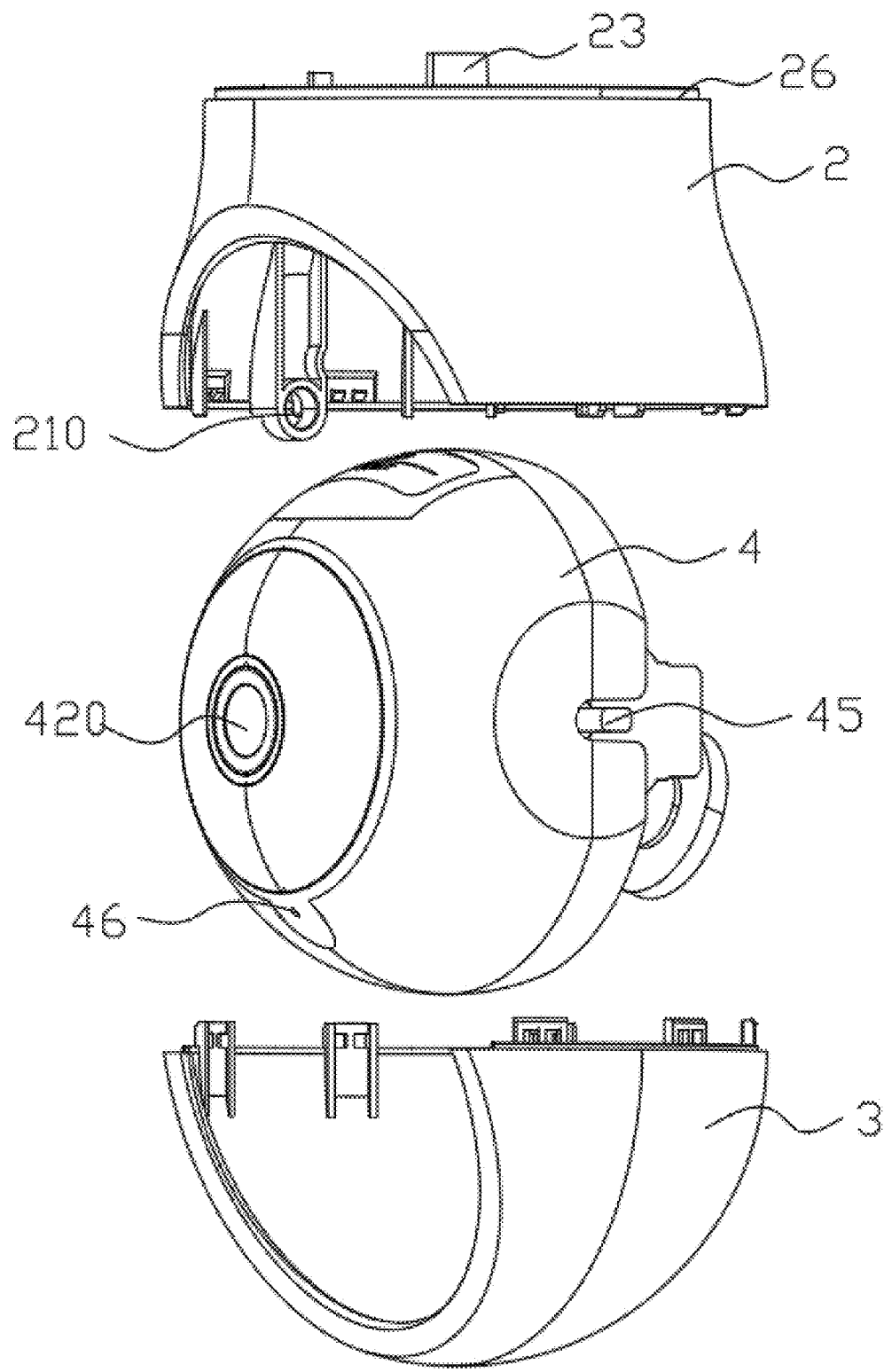
FIG. 23 is an exploded view of a surveillance camera (without a lamp base) according to Embodiment 5.

The invention is better An omnibearing surveillance camera of embodiment 4: as shown in FIG. 22, the difference from Embodiments 1 to 3 is that the rotary bracket and the bracket housing are changed in shape. In this case, the rotary bracket can be directly fixed to the bracket housing by screws, without a limiting structure, such that the assembly procedure is relatively simple, but the appearance is slightly worse than that in Embodiments 1 to 3. Moreover, any one of the ball heads in Embodiments 1 to 3 may also be used cooperatively. Other similarities will not be repeated.

Further, three infrared cameras 6 may be arranged at a bottom of the bracket housing 3. The three infrared cameras are arranged towards the ground to implement 360° surveillance without rotating the cameras. The infrared cameras may also be replaced with infrared thermal imagers, radars, or panoramic cameras.

The invention is better An omnibearing surveillance camera of embodiment 5: as shown in FIGS. 20 to 22, the difference from Embodiments 1 to 3 is that the rotary bracket 2 is connected and fixed to the bracket housing 3 by using the bayonets 200 and the recesses 30, and a lower end of the bracket housing wraps the ball head, such that the ball head is placed between the rotary bracket and the bracket housing, thereby avoiding falling of the ball head due to looseness. However, in this case, an up-down rotation angle of the ball head is limited to a great extent, so only up-down rotation at a specific angle can be implemented. Any one of the ball heads in Embodiments 1 to 3 may also be used cooperatively. Other similarities will not be repeated.

Figure 24:
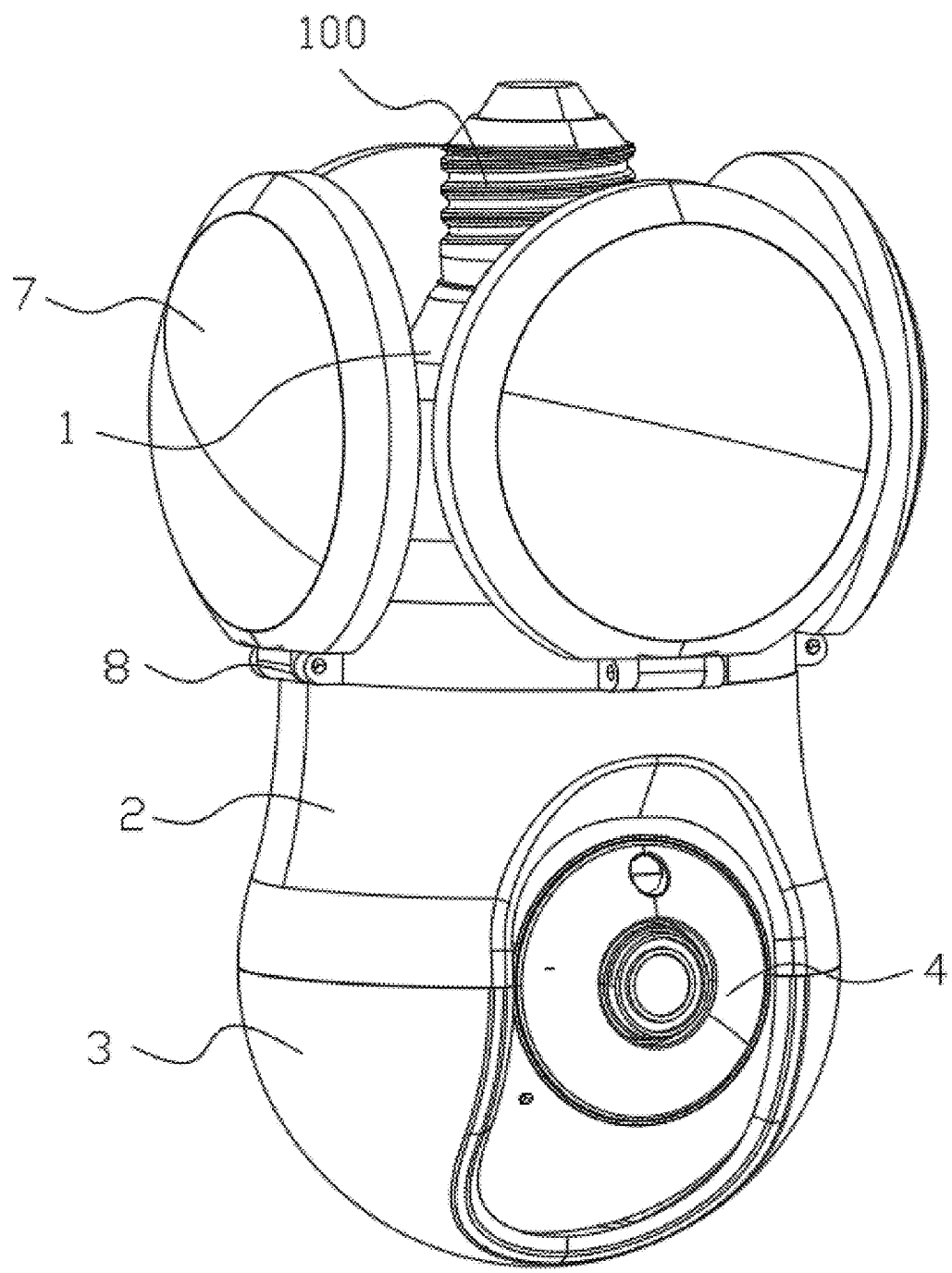
FIG. 24 is a three-dimensional view of a surveillance camera with folding lighting devices according to Embodiment 6.
Figure 25:
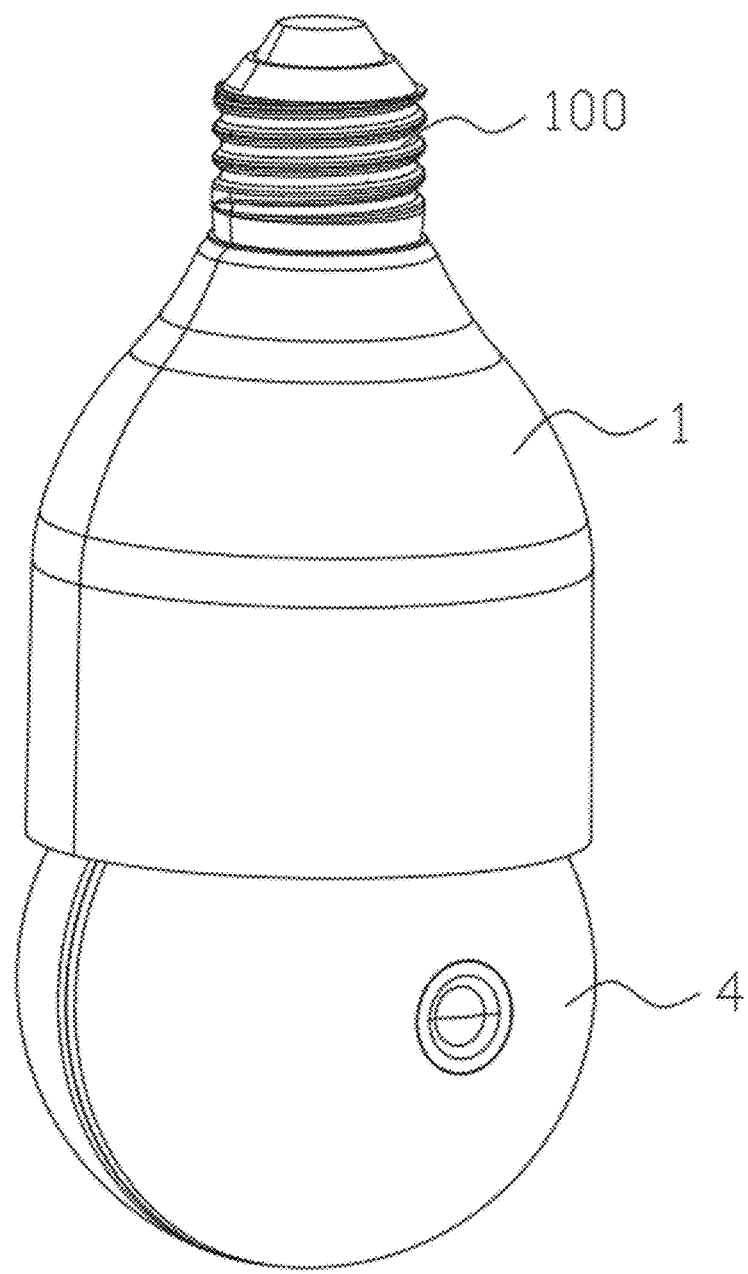
FIG. 25 is a three-dimensional view of a lighting camera according to Embodiment 7.
Figure 26:
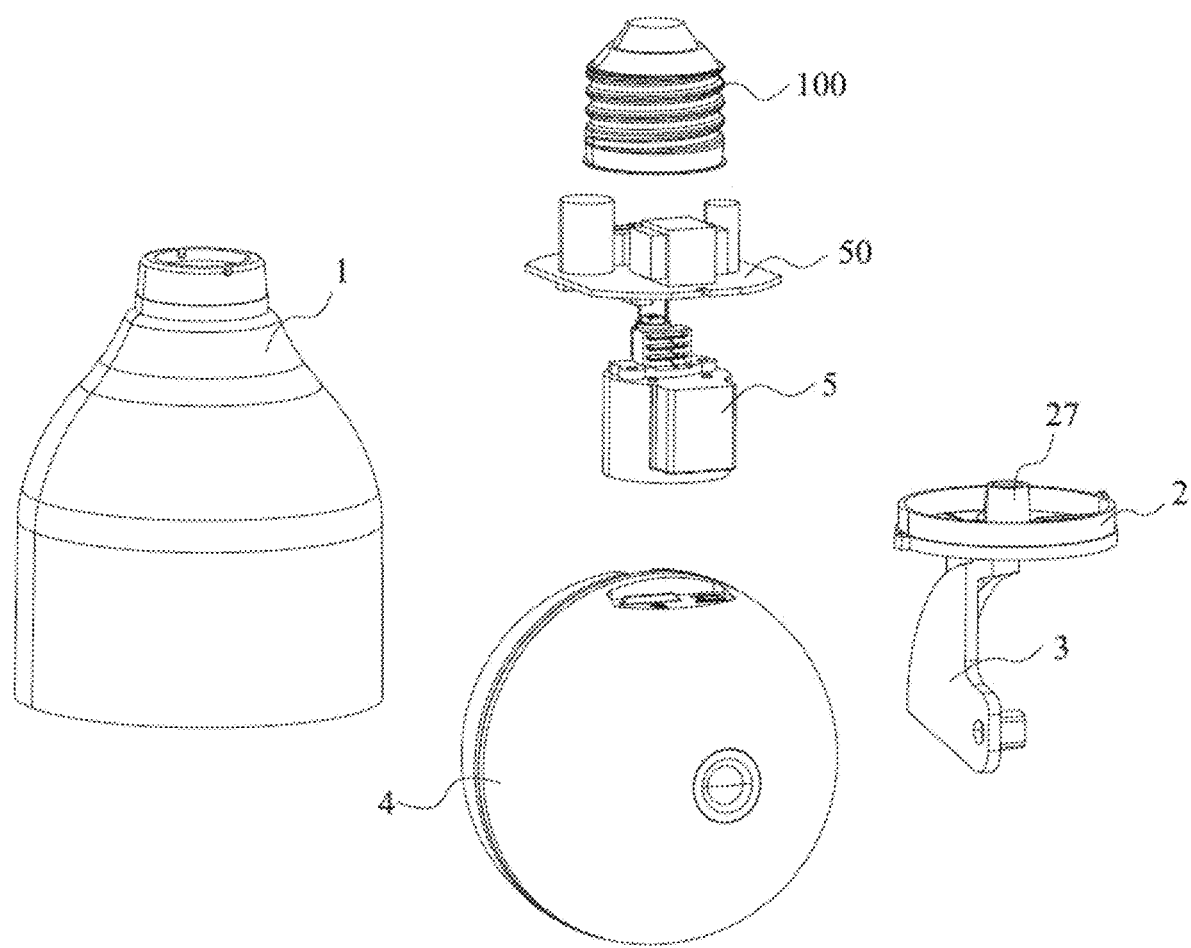
FIG. 26 is an exploded view of a lighting camera according to Embodiment 7.
Figure 27:
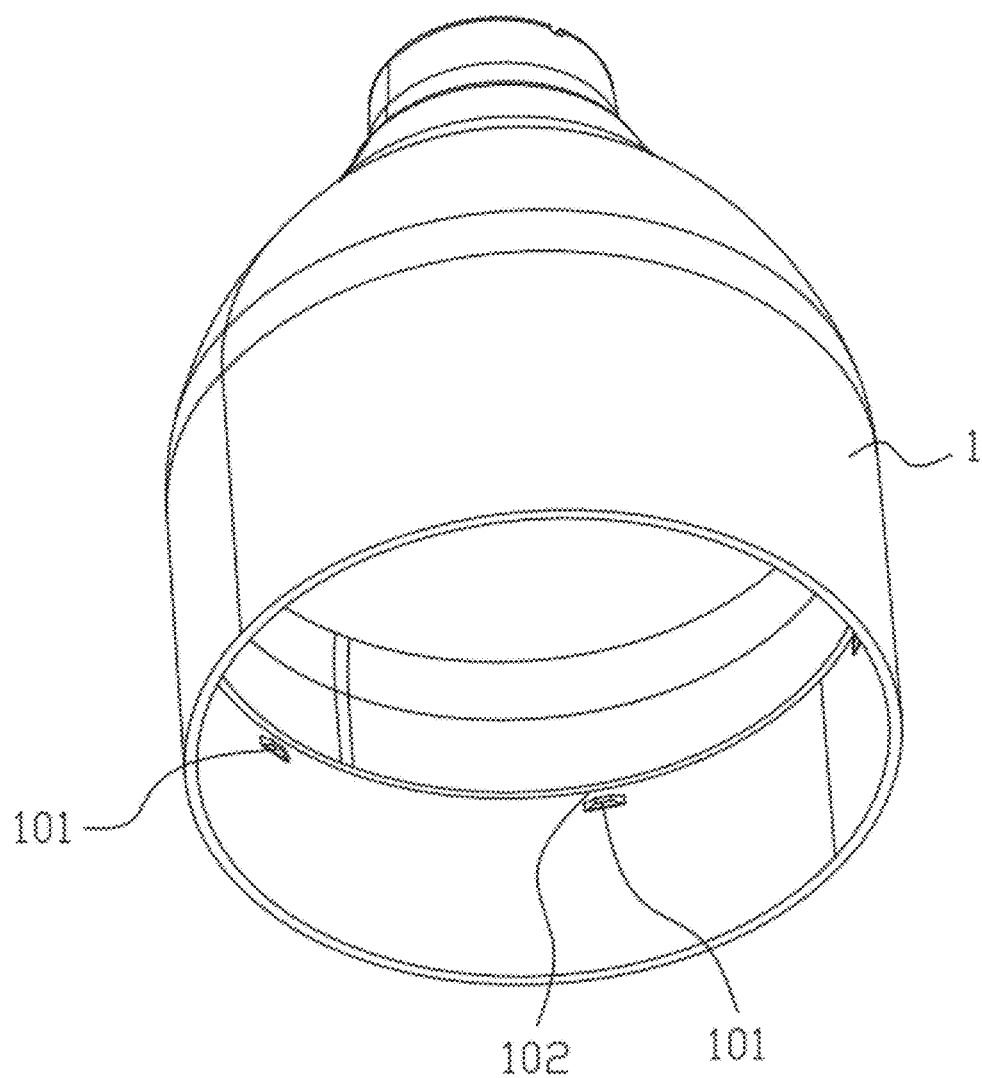
FIG. 27 is a bottom view of a lamp cap of a lighting camera according to Embodiment 7.
Figure 28:
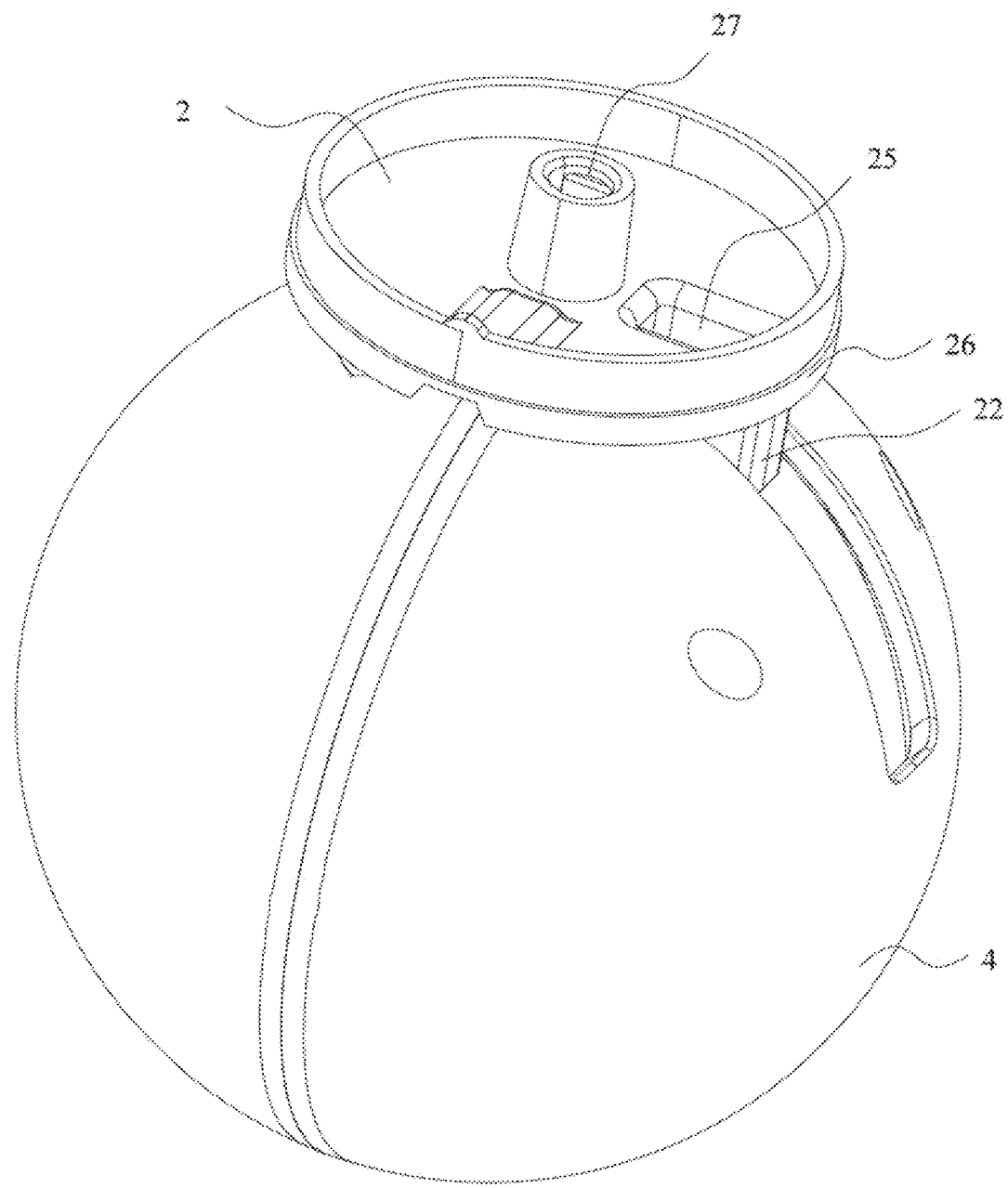
FIG. 28 is a structural diagram of a lamp cap and a rotary bracket of a lighting camera according to Embodiment 7.
Figure 29:
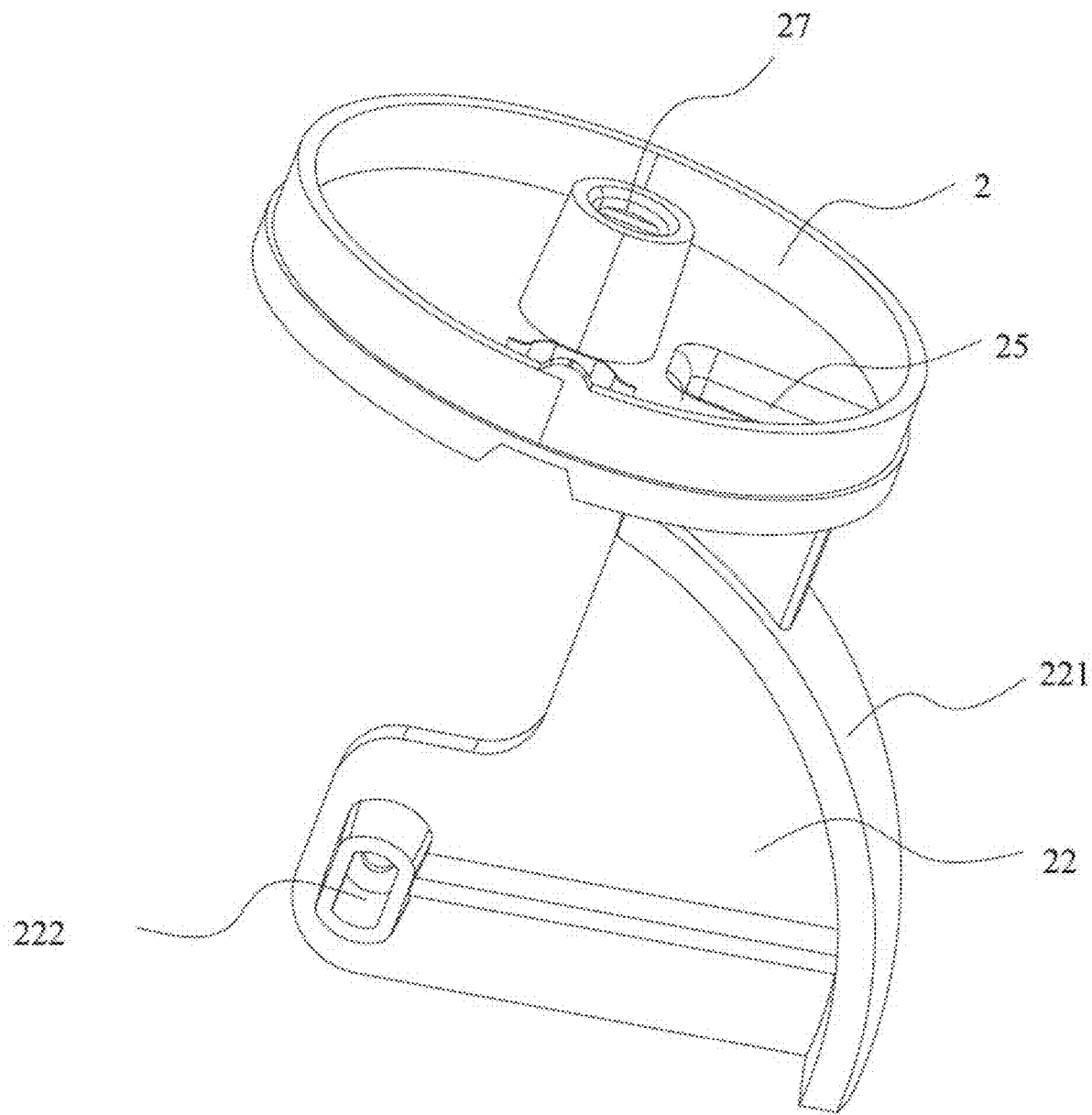
FIG. 29 is a three-dimensional view of a rotary bracket of a lighting camera according to Embodiment 7.
Figure 30:
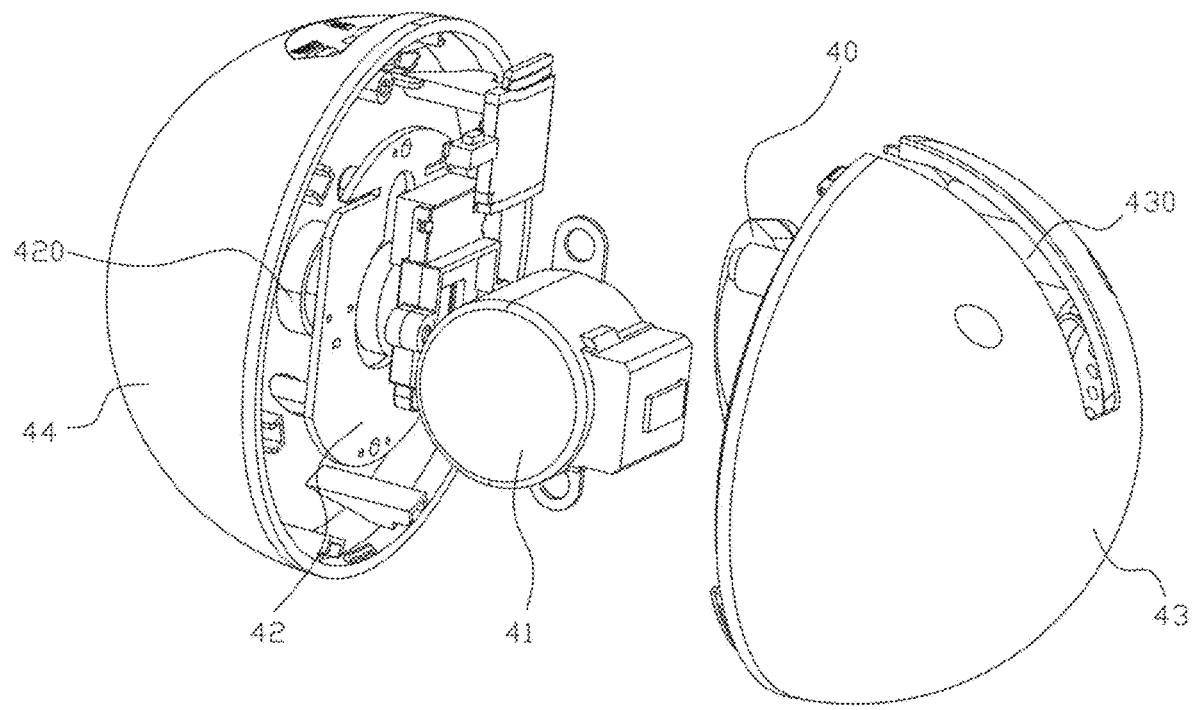
FIG. 30 is a three-dimensional exploded view of a ball head of a lighting camera according to Embodiment 7.

The invention is better An omnibearing surveillance camera of embodiment 6: as shown in FIG. 24, the difference from Embodiment 5 is that the ball head has a larger rotation angle in the up-down direction than that in Embodiment 5, and the product is more compact and attractive. Any one of the ball heads in Embodiments 1 to 3 may also be used cooperatively. Other similarities will not be repeated.

The invention is better An omnibearing surveillance camera of embodiment 7: as shown in FIGS. 25 to 30, the difference from Embodiment 1 is that a plurality of locking blocks 101 are arranged in the lamp cap 1, a sliding groove 102 is formed between the locking blocks and an inner wall of the lamp cap, the rotary bracket 2 is clamped into the sliding groove and is capable of rotating in the sliding groove, a motor fixing hole 27 for fixing the first motor is provided on the rotary bracket, the rotating shaft of the first motor is connected to the power board 50, and the power board is fixed in the lamp cap. When the first motor operates, the first motor itself rotates as the rotating shaft of the first motor is stationary, and the rotary bracket also rotates with the first motor. A sliding part 26 is arranged outside the rotary bracket. The sliding part rotates in the sliding groove to implement rotation of the rotary bracket relative to the lamp cap. A square groove 430 is provided on the ball head 4. The left lug 22 of the rotary bracket is capable of extending into the ball head through the square groove, and the rotating shaft hole 222 of the second motor is provided on the left lug. The rotating shaft of the second motor is inserted into the hole. A hollow part 25 is further provided on the left lug. The hollow part communicates with the inside of the ball head so that the connecting wire of the ball head is connected through the hollow part. In order to avoid a gap on the ball head, a stopper wall 221 is arranged on the left lug. The stopper wall has the same area as the square groove. A sealing ring may also be added at a joint to enhance the sealing performance. The second motor 41 is fixed in the ball head, and the rotating shaft of the second motor is fixed in the rotating shaft hole of the second motor. When the second motor rotates, due to fixation by the fixing hole of the second motor, the second motor drives the ball head to rotate by 360° in the up-down direction. The lamp 40 is further arranged in the ball head. The lamp may also be arranged at one end in the ball head that is close to the lamp cap. Optionally, the ball head front cover 44 and the ball head rear cover 43 may be set to be made of a light-transmitting material. When the lamp panel emits light, the light passes through the lamp panel so that the ball head provides lighting, and surveillance can be conducted. Other structures in the ball head are the same as those in the foregoing embodiments and will not be repeated here. It is to be noted that in the foregoing embodiments, the lamp may also be placed in the ball head, and the ball head is set to be made of the light-transmitting material so that the ball head emits light like a light bulb to provide lighting. However, due to the existence of the bracket housing, the light-emitting effect of the ball head is slightly worse than that in this embodiment.

It should be understood that the present invention has been described by some embodiments, and those skilled in the art will recognize that various changes or equivalents may be made to these features and embodiments without departing from the spirit and scope of the present invention. replace. In addition, in the teachings of this invention, these features and embodiments may be modified to adapt a particular situation and material without departing from the spirit and scope of the invention. Therefore, the present invention is not limited by the specific embodiments disclosed herein, and all embodiments falling within the scope of the claims of the present application fall within the protection scope of the present invention.

What is claimed is:

1. An omnibearing surveillance camera, comprising a lamp cap, a threaded interface being connected to the lamp cap, a power board connected to the threaded interface and a first motor arranged in the lamp cap, a mains supply being connected by the threaded interface to supply power to the power board, the mains supply being outputted after undergoing voltage reduction and rectification by the power board, a rotatable ball head being connected to a lower part of the lamp cap, wherein a surveillance camera, a camera mainboard, and a second motor connected to the camera mainboard are arranged in the ball head; and the camera mainboard is powered by the power board, and drives the first motor to drive the ball head to rotate left and right and/or drives the second motor to rotate to drive the ball head to rotate up and down, so as to implement rotational surveillance of the surveillance camera at any angle;

wherein a sliding connection device connected to the power board is further arranged in the lamp cap and comprises the first motor for driving the sliding connection device to rotate; a rotating shaft of the first motor is sleeved with a conductive ring base;

wherein a plurality of conductive rings are arranged on the conductive ring base, and each of the plurality of conductive rings comprises a first connecting wire connected to an external signal source and configured to input the external signal source, and a second connecting wire for outputting an input signal;

the first connecting wire is connected to the second connecting wire by an adapter ring for signal transmission; and when the rotating shaft of the first motor rotates, the plurality of conductive rings are relatively stationary, transmits a signal of the external signal source to the adapter ring by the first connecting wire, and then transmits the signal to the second connecting wire for output.

2. The camera according to claim 1, wherein the lamp cap is connected and fixed to the ball head by a bracket and is connected and locked to the bracket by a first clamping structure; the bracket comprises a rotary bracket and a bracket housing connected to the rotary bracket by a second clamping structure; the ball head is fixed to the rotary bracket by the bracket housing and is rotatable relative to the bracket housing; and the rotary bracket is clamped and fixed to the lamp cap and is rotatable relative to the lamp cap.

3. The camera according to claim 2, wherein the first clamping structure comprises a sliding groove provided on an inner wall of an upper end of the lamp cap and a convex ring arranged at a bottom of the rotary bracket in a manner of corresponding to the sliding groove; the convex ring is clamped into the sliding groove and is rotatable in the sliding groove; and at least one clamping block is further arranged at an upper end of the sliding groove and restricts the convex ring clamped into the sliding groove from separating from the sliding groove when the convex ring rotates in the sliding groove.

4. The camera according to claim 2, wherein the second clamping structure comprises protrusions arranged on the rotary bracket; recesses are provided on the bracket housing in a manner of corresponding to the protrusions; bayonets are provided on the protrusions; bumps corresponding to the bayonets are arranged on the recesses and are clamped into the bayonets to lock the rotary bracket to the bracket housing; and the protrusions are relatively movable to release a locking effect of the clamping structure.

5. The camera according to claim 2, wherein two lugs are further arranged on the rotary bracket; one of the lugs is rotatably connected to one end of the ball head, and the other end of the lugs is provided with a vertical groove; the other end of the ball head is placed in the vertical groove, and the ball head is caused to rotate relative to the rotary bracket; and a rib is arranged on the bracket housing in a manner of corresponding to the vertical groove and is inserted into the vertical groove.

6. The camera according to claim 5, wherein a rotating shaft of the second motor extends out of the ball head and is placed in the vertical groove; the vertical groove generates a clamping force on the rotating shaft, such that the rotating shaft, when rotating, drives the ball head to rotate relative to the rotary bracket; a support plate for supporting the rotating shaft of the second motor is further provided in the rotary bracket and is placed between the two lugs; and when the rotary bracket is locked to the bracket housing, a lower end of the rib is in contact with an upper end of the rotating shaft of the second motor.

7. The camera according to claim 2, wherein a rotating shaft fixing hole of the first motor is provided on the rotary bracket; the first motor is partially inserted into the rotating shaft fixing hole of the first motor and drives the rotary bracket to rotate relative to a lamp base; a ball head fixing hole and a second motor fixing hole are provided on the rotary bracket; one side of the ball head is fixedly arranged in the ball head fixing hole, and the other side of the ball head is arranged in the second motor fixing hole; and the second motor is inserted into the second motor fixing hole to rotate the ball head up and down.

8. The camera according to claim 7, wherein a limiting structure is arranged on the rotary bracket and the bracket housing, and a lower end of the rotary bracket is opened, such that an up-down rotation angle of the ball head is greater than 180; or a buckle structure is arranged on the rotary bracket and the bracket housing, and the lower end of the rotary bracket wraps the ball head, such that the rotation angle of the ball head is less than 180°.

9. The camera according to claim 1, wherein an external electrical signal is inputted by the first connecting wire, transmitted to the second connecting wire by the conductive ring, and then outputted; and the conductive ring base is made of a non-conductive material.

10. The camera according to claim 9, wherein an insulating ring is arranged between every two of the plurality of conductive rings; the first connecting wire is in contact with an inner wall of each of the conductive rings for electrical conduction; and the second connecting wire is provided with clamping ends which are in contact with an outer wall of the conductive ring for electrical conduction, and an output end connected to a control board.

11. The camera according to claim 10, wherein the second connecting wire is provided with two clamping ends which are in contact with the outer wall of the conductive ring and share one output end; a sliding groove for fixing the clamping ends is provided on the outer wall of the conductive ring; the two clamping ends are in point contact and/or line contact with the sliding groove for electrical conduction; and a clamping force is generated between the two clamping ends to the conductive ring.

12. The camera according to claim 1, wherein an upper end of the conductive ring base is cylindrical and fixes the sliding connection device, a lower part of the conductive ring base is provided with a support end having a greater radius than the sliding connection device, the upper end of the conductive ring base is provided with square slots for insertion of the first connecting wires and columnar cavities for accommodating the first connecting wires, the square slots communicate with the columnar cavities, one end of each of the first connecting wires extends out of a corresponding one of the columnar cavities to be connected to the external signal source, and the other end of the first connecting wire passes through a corresponding one of the square slots to be in contact with an inner wall of the adapter ring for signal transmission; and a second one of the plurality of conductive rings is a counting device, an insulating part is arranged on the adapter ring, the first connecting wire is in contact with the adapter ring and is provided with a contact point, and when the first connecting wire rotates to the insulating part, electrical signal transmission for the counting device is disabled.

13. The camera according to claim 1, wherein the rotating shaft of the first motor is elliptical, and when the rotating shaft of the first motor rotates, the conductive ring base rotates with the rotating shaft of the first motor and drives the first connecting wires and the adapter rings to rotate with the rotating shaft of the first motor, and the adapter rings are slidably connected to the second connecting wires for signal transmission;

the insulating part is arranged on a surface of a corresponding one of the adapter rings, when the adapter ring rotates, a corresponding one of the first connecting wires keeps in contact with the adapter ring to turn on the counting device, and when the adapter ring rotates to the insulating part and is in contact with the first connecting wire, the counting device is turned off;

or an insulating protrusion is arranged on the adapter ring, an end part of the first connecting wire is in an outward protruding arc shape, when the adapter ring rotates, the first connecting wire keeps in contact with the adapter ring to turn on the counting device, when the adapter ring rotates to the insulating protrusion, the insulating protrusion pushes the first connecting wire to move to be in contact with the insulating protrusion, and the electrical signal transmission for the counting device is disabled, and after the adapter ring continues to rotate, the first connecting wire moves to be in contact with the adapter ring to enable the electrical signal transmission for the counting device; and the control board determines a rotation angle of the counting device based on a duration for which the electrical signal transmission for the counting device is disabled.

14. The camera according to claim 1, further comprising at least one lamp panel which emits light so that the camera turns into a lighting device to provide lighting.

15. The camera according to claim 14, wherein the lamp panel is arranged outside the lamp cap by a rotating mechanism; the rotating mechanism comprises a connecting column arranged below the lamp panel and two connecting lugs arranged on the lamp cap; a rotating shaft is arranged at two ends of the connecting column; rotating holes are correspondingly provided on the connecting lugs; and the rotating shaft is inserted into the rotating holes to fix the connecting column between the two connecting lugs, such that the lamp panel rotates relative to the lamp cap.

16. The camera according to claim 15, wherein travel grooves are provided on two sides of the connecting column; travel teeth are arranged on the connecting lugs in a manner of corresponding to the travel grooves; the travel teeth rotate in the travel grooves to limit a rotation angle of the lighting device on the lamp base; when the travel teeth are located at end parts of the travel grooves, an angle between the lighting device and the lamp base is 0° or 90°; angular grooves are provided in each of the travel grooves; and when the travel teeth are placed in the angular grooves, an angle of the lighting device is fixed.

17. The camera according to claim 14, wherein there are a plurality of lamp panels evenly distributed around the lamp cap;

or the lamp panels are placed in the ball head made of a light-transmitting material, and after the lamp panels emit light, the ball head emits light, such that the camera provides lighting.

18. The camera according to claim 1, wherein an infrared thermal imager, a lighting lamp, or a panoramic camera is further arranged on the ball head;

or at least one infrared thermal imager, radar or panoramic camera is arranged at a bottom of the bracket housing, and at least two infrared thermal imagers or radars are arranged to implement 360° surveillance.

19. The camera according to claim 1, wherein the threaded interface is capable of being replaced with a socket to be connected to the mains supply for supplying power to the power board.

* * * * *